United States Patent
Shimauchi

(10) Patent No.: US 12,272,090 B2
(45) Date of Patent: Apr. 8, 2025

(54) INFORMATION PROCESSING APPARATUS, AND INFORMATION PROCESSING METHOD

(71) Applicant: SONY GROUP CORPORATION, Tokyo (JP)

(72) Inventor: Kazuhiro Shimauchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 415 days.

(21) Appl. No.: 17/635,286

(22) PCT Filed: Aug. 11, 2020

(86) PCT No.: PCT/JP2020/030559
§ 371 (c)(1),
(2) Date: Feb. 14, 2022

(87) PCT Pub. No.: WO2021/033592
PCT Pub. Date: Feb. 25, 2021

(65) Prior Publication Data
US 2022/0327732 A1    Oct. 13, 2022

(30) Foreign Application Priority Data
Aug. 22, 2019  (JP) .................................. 2019-152122

(51) Int. Cl.
*G06T 7/73*       (2017.01)
*G06V 40/16*      (2022.01)
*G06V 40/20*      (2022.01)

(52) U.S. Cl.
CPC .............. *G06T 7/73* (2017.01); *G06V 40/161* (2022.01); *G06V 40/23* (2022.01)

(58) Field of Classification Search
CPC ... G06T 7/70; G06T 7/73; G06T 2207/30201; G06V 40/16; G06V 40/161; G06V 40/23;
(Continued)

(56) References Cited

U.S. PATENT DOCUMENTS

| | | | |
|---|---|---|---|
| 2005/0152579 | A1 | 7/2005 | Park et al. |
| 2010/0183227 | A1 | 7/2010 | Park et al. |

(Continued)

FOREIGN PATENT DOCUMENTS

| | | |
|---|---|---|
| CN | 102473283 A | 5/2012 |
| EP | 3454254 A1 | 3/2019 |

(Continued)

OTHER PUBLICATIONS

Daisuke Maruyama, et al., "A method for hiding facial images in lecture videos to avoid infringementation of portrait right", IEICE Technical Report, Japan, Institute of Electronics, Information and Communication Engineers, Jun. 12, 2010, the 110th volume, No. 85, p. 7-12.

(Continued)

*Primary Examiner* — Siamak Harandi
(74) *Attorney, Agent, or Firm* — CHIP LAW GROUP

(57) ABSTRACT

An information processing apparatus includes: a controller that identifies a non-processing target subject, among multiple subjects in a frame included in a dynamic image, as a non-processing target that is not subjected to predetermined image processing, on a basis of positional relationships between multiple subject areas corresponding to the respective multiple subjects and a specific area in the frame; and an image processor that performs the predetermined image processing on a processing target area corresponding to a processing target subject other than the non-processing target subject, among the multiple subjects.

19 Claims, 25 Drawing Sheets

(58) Field of Classification Search
CPC ...... G06V 20/10; G06V 40/172; G06V 40/20; H04N 2013/40; H04N 23/61; H04N 23/611; G08B 13/19686
See application file for complete search history.

(56) References Cited

U.S. PATENT DOCUMENTS

| | | |
|---|---|---|
| 2012/0151601 A1 | 6/2012 | Inami et al. |
| 2019/0073813 A1 | 3/2019 | Ito |
| 2020/0118317 A1* | 4/2020 | Mysore Siddu .......... G06T 7/73 |
| 2022/0005219 A1* | 1/2022 | Cho .......................... G06T 5/70 |

FOREIGN PATENT DOCUMENTS

| | | |
|---|---|---|
| JP | 2004-062560 A | 2/2004 |
| JP | 2009-284235 A | 12/2009 |
| JP | 5637633 B2 | 12/2014 |
| JP | 2016150849 A | 8/2016 |
| JP | 2019050553 A | 3/2019 |
| KR | 10-2005-0048062 A | 5/2005 |
| WO | 2012/004907 A1 | 1/2012 |
| WO | WO-2017150103 A1 | 9/2017 |

OTHER PUBLICATIONS

International Search Report and Written Opinion of PCT Application No. PCT/JP2020/030559, issued on Feb. 1, 2021, 17 pages of ISRWO.

* cited by examiner

INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2020/030559 filed on Aug. 11, 2020, which claims priority benefit of Japanese Patent Application No. JP 2019-152122 filed in the Japan Patent Office on Aug. 22, 2019. Each of the above-referenced applications is hereby incorporated herein by reference in its entirety.

TECHNICAL FIELD

The present disclosure relates to an information processing apparatus, an information processing method, and a program, and particularly relates to an information processing apparatus, an information processing method, and a program that can protect the privacy of subjects other than a main subject.

CROSS REFERENCE TO RELATED APPLICATIONS

This application claims the benefit of Japanese Priority Patent Application JP 2019-152122 filed on Aug. 22, 2019, the entire contents of which are incorporated herein by reference.

BACKGROUND ART

There is a technology for protecting the privacy of a subject appearing in a dynamic image.

For example, PTL 1 discloses an imaging apparatus that allows a user to specify the number of main subjects, skips the specified number of subjects in descending order of face size, and performs mosaic processing on the subsequent faces.

Additionally, PTL 2 discloses that, in a case where a face image registered in advance and a face image detected from a dynamic image being captured by a camera do not match, mosaic processing is performed on the face image detected from the dynamic image.

CITATION LIST

Patent Literature

[PTL 1]
  JP 2009-284235A
[PTL 2]
  JP 2004-62560A

SUMMARY OF INVENTION

Technical Problem

In a case where the technology of PTL 1 is applied to a lecture capture system that records lectures at universities and other schools and allows students to take the lectures at remote locations, the face of a lecturer who is the main subject does not necessarily appear larger than the faces of other subjects (auditors). For this reason, in some cases, mosaic processing may be performed on the face of the lecturer, or mosaic processing may not be performed on the face of the auditor whose privacy needs to be protected.

Additionally, in a case where the technology of PTL 2 is applied to a lecture capture system, it is necessary to register the face image of all of the lecturers, which increases costs. Moreover, in a case where a guest speaker whose face image is not registered gives a lecture, mosaic processing is unintentionally performed on the face of the guest speaker.

The present disclosure has been made in view of such circumstances, and is intended to more reliably and easily protect the privacy of subjects other than a main subject.

Solution to Problem

An information processing apparatus according to a first aspect of the present disclosure is an information processing apparatus including: a controller that identifies a non-processing target subject, among multiple subjects in a frame included in a dynamic image, as a non-processing target that is not subjected to predetermined image processing, on the basis of positional relationships between multiple subject areas corresponding to the respective multiple subjects and a specific area in the frame; and an image processor that performs the predetermined image processing on a processing target area corresponding to a processing target subject other than the non-processing target subject, among the multiple subjects.

An information processing method or a program of the first aspect of the present disclosure is an information processing method or a program for causing a computer to execute processing including: identifying a non-processing target subject, among multiple subjects in a frame included in a dynamic image, as a non-processing target that is not subjected to predetermined image processing, on the basis of positional relationships between multiple subject areas corresponding to the respective multiple subjects and a specific area in the frame; and performing the predetermined image processing on a processing target area corresponding to a processing target subject other than the non-processing target subject, among the multiple subjects.

An information processing apparatus according to a second aspect of the present disclosure is an information processing apparatus including: a controller that identifies a non-processing target subject, among multiple subjects in a frame included in a dynamic image, as a non-processing target that is not subjected to predetermined image processing, on the basis of a history of posture information corresponding to each of the multiple subjects; and an image processor that performs the predetermined image processing on a processing target area corresponding to a processing target subject other than the non-processing target subject, among the multiple subjects.

In the present disclosure, a non-processing target subject is identified, among multiple subjects in a frame included in a dynamic image, as a non-processing target that is not subjected to predetermined image processing, on the basis of positional relationships between multiple subject areas corresponding to the multiple subjects and a specific area in the frame, or a history of posture information corresponding to each of the multiple subjects. Then, the predetermined image processing is performed on a processing target corresponding to a processing target subject other than the non-processing target subject, among the multiple subjects.

DESCRIPTION OF EMBODIMENTS

Hereinafter, modes for carrying out the present disclosure (hereinafter referred to as embodiments) will be described. Note that the description will be given in the following order.

1. Issues in previously known system
2. Configuration of image capturing system according to first embodiment
2-1. First configuration example and operation of control device
2-2. Second configuration example and operation of control device
2-3. Third configuration example and operation of control device
3. Configuration of image capturing system according to second embodiment
3-1. First configuration example and operation of control device
3-2. Second configuration example and operation of control device
3-3. Modifications
4. Configuration example of computer 1. Issues in Previously Known System In recent years, lecture capture systems have been provided that record lectures at universities and other schools and allow students to take the lectures at remote locations. In a lecture capture system, dynamic images of a lecturer and auditors are captured, and the lecturer is tracked and the auditors' motions are detected to switch between the dynamic images of the lecturer and the auditor, or combine both dynamic images into one dynamic image to output the dynamic image.

Meanwhile, in the lecture capture system, while capturing the dynamic image of the lecturer who is the main subject, it is necessary to protect the privacy of other subjects such as the auditor.

As a technology for protecting the privacy of subjects other than the main subject, PTL 1 discloses an imaging apparatus that allows a user to specify the number of main subjects, skips the specified number of subjects in descending order of face size, and performs mosaic processing on the subsequent faces, for example. The technology of PTL 1 is premised on the face of the main subject appearing larger than the faces of subjects other than the main subject.

Figure 1:
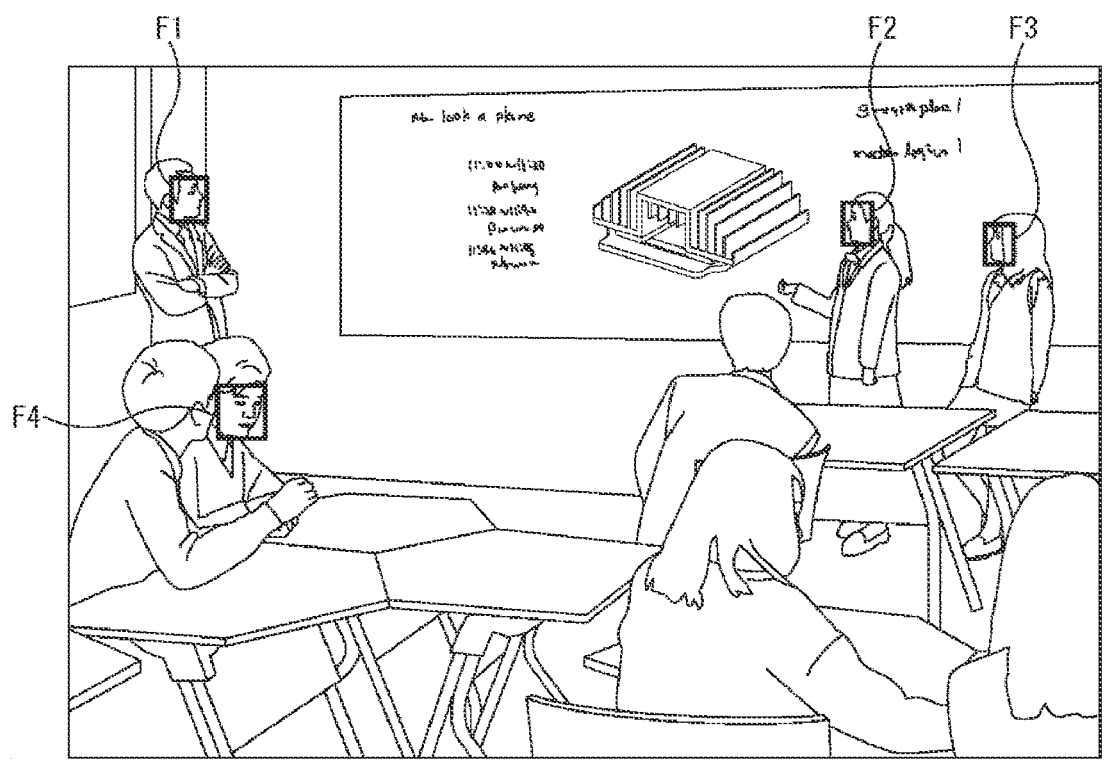
FIG. 1 is a diagram for describing a problem in a previously known system.

FIG. 1 shows an example of a dynamic image in a case where the technology of PTL 1 is applied to a lecture capture system. In the example of FIG. 1, the face of the detected lecturer (teacher) is indicated by a face frame F1, and the face of each of two auditors (students) on the stage is indicated by face frames F2, F3. The face of one of many seated auditors is indicated by a face frame F4.

In the lecture capture system, the face of the lecturer who is the main subject does not necessarily appear larger than the face of the auditor. Hence, in some cases, mosaic processing may be performed on the face of the lecturer, or mosaic processing may not be performed on the face of the auditor whose privacy needs to be protected.

Figure 2:
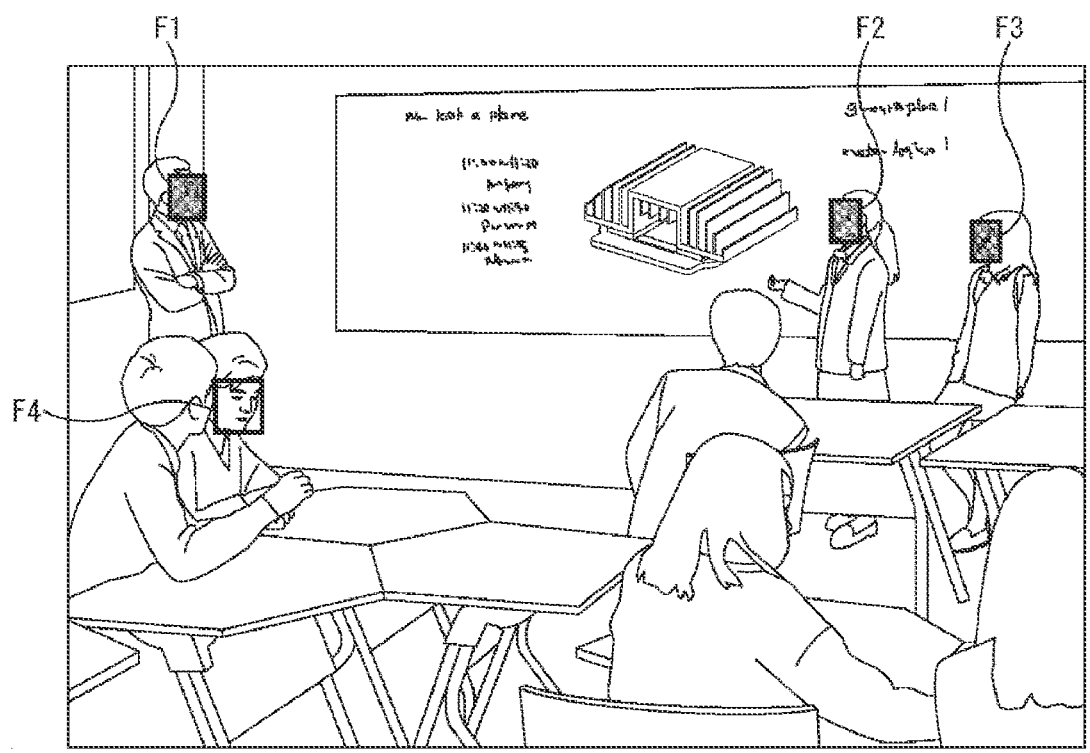
FIG. 2 is a diagram for describing the problem in the previously known system.

In the example of FIG. 1, the face of the auditor indicated by the face frame F4 appears larger than the face of the lecturer indicated by the face frame F1. For this reason, as shown in FIG. 2, while mosaic processing is performed on the face of the lecturer, mosaic processing is not performed on the face of the auditor whose privacy needs to be protected.

Additionally, PTL 2 discloses that, in a case where a face image registered in advance and a face image detected from a dynamic image being captured by a camera do not match, mosaic processing is performed on the face image detected from the dynamic image.

However, in a case where the technology of PTL 2 is applied to a lecture capture system, it is necessary to register the face image of all of the lecturers, which increases cost. Moreover, in a case where a guest speaker whose face image is not registered gives a lecture, mosaic processing is unintentionally performed on the face of the guest speaker.

In addition, there is a technology in which AI learns the face of a subject selected in a dynamic image, and in a case where the learned face is recognized in another scene, the face is blurred.

In a case where this technology is applied to a lecture capture system, it is necessary to select the face of all of the students (auditors) to be subjected to blurring processing in a dynamic image, and the work increases cost. Additionally, every time a student enters a classroom where a lecture is given, the face of the student has to be selected, and manpower to constantly monitor the classroom is necessary.

Against this background, a description will hereinafter be given of a configuration and operation of a system for realizing more reliable and simple protection of the privacy of subjects other than the main subject.

2. Configuration of Image Capturing System According to First Embodiment

Figure 3:
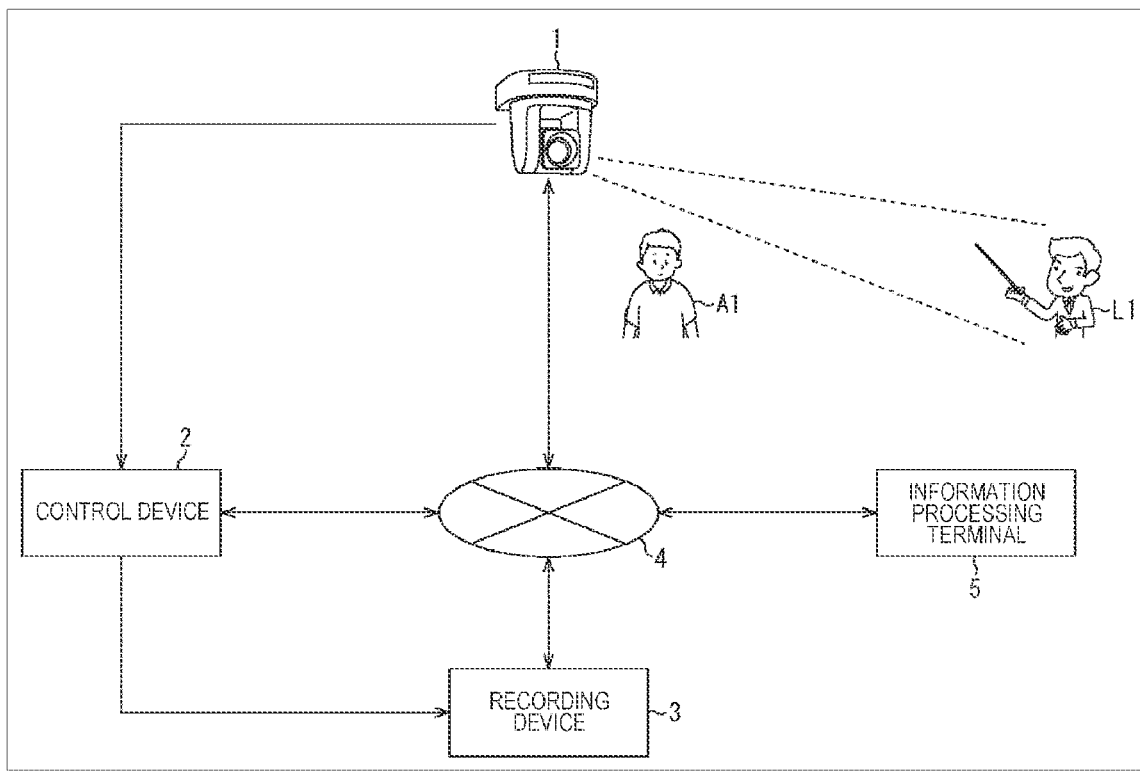
FIG. 3 is a block diagram showing a configuration example of an image capturing system according to an embodiment of the present disclosure.

FIG. 3 is a diagram showing a configuration example of an image capturing system according to a first embodiment of the present disclosure.

The image capturing system of FIG. 3 is configured as a lecture capture system, and is installed in a classroom or a lecture hall where a lecturer L1 gives a lecture to multiple auditors A1.

The image capturing system of FIG. 1 is configured of at least one camera 1 and a control device 2 connected to the camera 1. The control device 2 is accompanied by a recording device 3 and is further connected to an information processing terminal 5 through a network 4.

The camera 1 is configured as a PTZ camera having a function of mechanically panning and tilting, and capable of optically and electronically zooming, for example. The camera 1 captures an image of the lecturer L1 who is the main subject so that the image is within the angle of view, and outputs the obtained dynamic image to the control device 2 or to the information processing terminal 5 through the network 4.

The control device 2 is configured as an image processing device according to an embodiment of the present disclosure, and performs predetermined image processing on a dynamic image output from the camera 1 on the basis of an instruction input from the information processing terminal 5 or the like. The dynamic image that has undergone image processing is output to the recording device 3 or output to the information processing terminal 5 through the network 4.

The control device 2 may be configured by dedicated hardware having the function, or may be configured by a general computer, and each function may be implemented by software. Additionally, instead of being configured as an independent device, the control device 2 may be incorporated in another device such as the camera 1 or an unillustrated switcher or server.

The information processing terminal 5 is a terminal for the auditor A1 in a space where the lecture by the lecturer L1 is given or a viewer/listener in a remote location to view an image output by the control device 2.

The information processing terminal 5 may be configured by dedicated hardware having the function, or may be configured by a general computer or mobile terminal, and the function may be implemented by software.

<2-1. First Configuration Example and Operation of Control Device>

(Configuration Example of Control Device)

Figure 4:
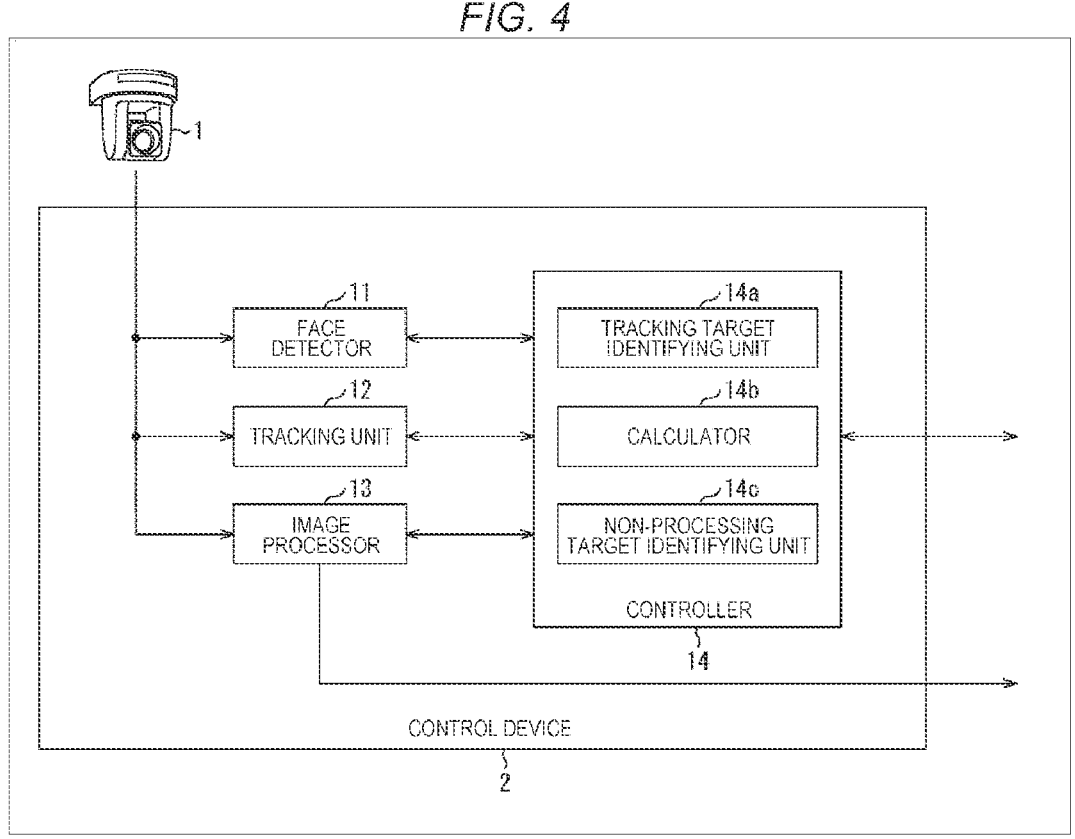
FIG. 4 is a block diagram showing a functional configuration example of a control device.

FIG. 4 is a block diagram showing a functional configuration example of the control device 2.

The control device 2 of FIG. 4 includes a face detector 11, a tracking unit 12, an image processor 13, and a controller 14.

The face detector 11 detects a face in a dynamic image output from the camera 1, and supplies a position (coordinates), size, and the like of the detected face to the controller 14.

The tracking unit 12 controls tracking in which a predetermined subject is regarded as a tracking target subject, among multiple subjects in a dynamic image from the camera 1, and supplies the position (coordinates), size, and the like of the subject to the controller 14. For example, the tracking unit 12 tracks a specific subject by matching areas of similar colors and shapes between frames of a dynamic image.

The image processor 13 performs predetermined image processing on a predetermined subject as a processing target in a dynamic image from the camera 1. Specifically, the image processor 13 performs masking processing of masking a face area as a processing target area corresponding to a processing target subject that is a subject (e.g., auditor A1) other than a non-processing target subject described later, among multiple subjects in a dynamic image from the camera 1. Here, note that mosaic processing may be performed as image processing instead of masking processing. The dynamic image that has been subjected to image processing is output to the recording device 3 directly or through the controller 14, or is output to the information processing terminal 5 through the network 4.

The controller 14 exchanges data with each of the face detector 11, the tracking unit 12, and the image processor 13, controls each unit, and outputs the result of each unit to the outside, for example.

The controller 14 has a tracking target identifying unit 14a, a calculator 14b, and a non-processing target identifying unit 14c.

The tracking target identifying unit 14a identifies a subject to be tracked by the tracking unit 12 in a dynamic image from the camera 1.

The calculator 14b calculates an overlap rate indicating the degree of overlap between a face detected by the face detector 11 and a tracking target of the tracking unit 12 in a dynamic image from the camera 1.

The non-processing target identifying unit 14c identifies a non-processing target subject as a non-processing target that is not subjected to predetermined image processing (not set as processing target of image processor 13) among multiple subjects in a frame included in a dynamic image from the camera 1, on the basis of positional relationships between multiple subject areas corresponding to the multiple subjects and a specific area in the frame. The positional relationship here indicates whether or not the subject area is located in the specific area. "The subject area is located in the specific area" not only means that the entire subject area is included in the specific area, but also that a predetermined proportion of the subject area is included in the specific area, for example. Based on the positional relationship, the non-processing target identifying unit 14c identifies, as a non-processing target subject, a subject corresponding to a subject area located in the specific area.

(Operation of Control Device)

Next, an example of masking processing of the face area of an auditor by the control device 2 of FIG. 4 will be described with reference to a flowchart of FIG. 5.

In step S11, the face detector 11 is controlled by the controller 14 to detect all faces in a dynamic image from the camera 1.

Figure 6:
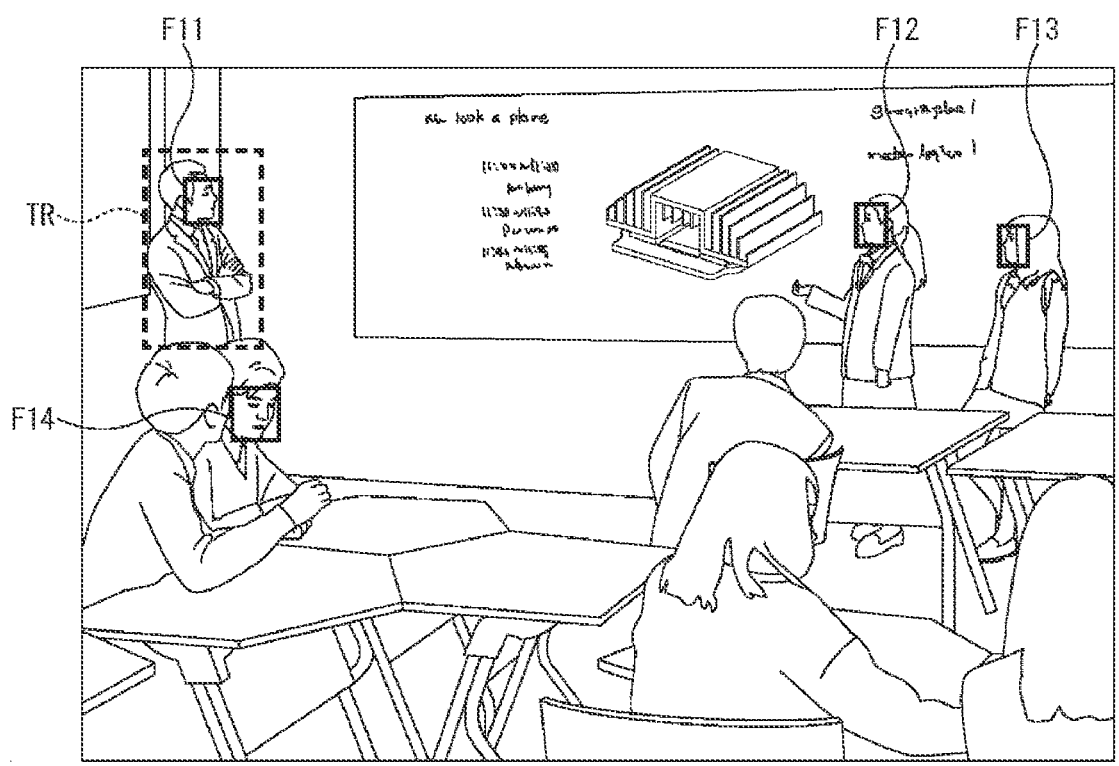
FIG. 6 is a diagram showing an example of a tracking frame.

As a result of the face detection, as shown in FIG. 6, from the dynamic image from the camera 1, a face frame F11 indicating the position and size of the face of a lecturer, face frames F12, F13 indicating the position and size of the face of two auditors (students) on a stage, and a face frame F14 indicating the position and size of the face of one of many seated auditors are obtained.

In step S12, the tracking target identifying unit 14a identifies a tracking target of the tracking unit 12 in the dynamic image from the camera 1.

In step S13, the tracking unit 12 is controlled by the controller 14 to start tracking the tracking target identified by the tracking target identifying unit 14a.

Figure 7:
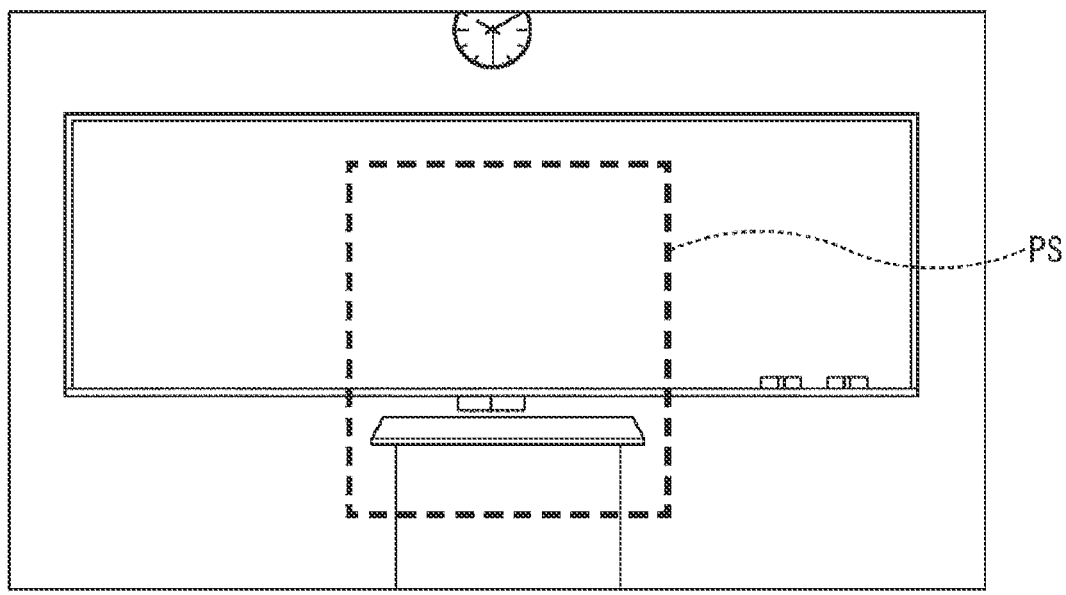
FIG. 7 is a diagram showing an example of a preset position.

When the controller 14 controls each of the face detector 11, the tracking unit 12, and the image processor 13, a preset position as indicated by frame PS in FIG. 7 is set as a preset position of the angle of view of the camera 1, for example. In FIG. 7, a range centered on the classroom blackboard and platform (teacher's desk) is set as the preset position (frame PS).

For example, when the lecturer L1 stands on the platform, that is, when the face detector 11 detects a face in frame PS set in the dynamic image from the camera 1, the tracking target identifying unit 14a uses the detection as a trigger to transition to controlling the tracking unit 12. Thus, tracking of the tracking target is started. At this time, the controller 14 may perform statistical processing based on information inside and outside frame PS.

As a result of the tracking target identification, as shown in FIG. 6, a tracking frame TR indicating a tracking area corresponding to the position and size of the lecturer who is the tracking target is set in the dynamic image from the camera 1.

Note that the tracking target may be identified by the user performing an operation for designating the tracking target on a user interface (UI) of the information processing terminal 5, and information indicating the operation content being supplied to the controller 14 through the network 4.

In step S14, the calculator 14b calculates the overlap rate with the tracking frame TR for all face frames that are results of face detection by the face detector 11.

In Step S15, the non-processing target identifying unit 14c determines whether or not the overlap rate with the tracking frame TR of one face frame of interest (focused face frame) is the highest.

If it is not determined, in step S15, that the overlap rate between the focused face frame and the tracking frame TR is the highest, that is, if the focused face frame does not overlap the tracking frame TR, the processing proceeds to step S16.

In step S16, the image processor 13 is controlled by the controller 14 to perform masking processing on a face area indicated by the focused face frame.

On the other hand, if it is determined, in step S15, that the overlap rate between the focused face frame and the tracking frame TR is the highest, that is, if the focused face frame overlaps the tracking frame TR, step S16 is skipped. Specifically, the non-processing target identifying unit 14c identifies the subject in the face area indicated by the focused face frame as a non-processing target, and the image processor 13 does not perform masking processing on the face area of the subject identified as a non-processing target.

Thereafter, in step S17, it is determined whether or not all face frames have been subjected to processing. If not all face frames have been subjected to processing, the processing returns to step S15, and the processing of steps S15 and S16 are repeated.

Figure 8:
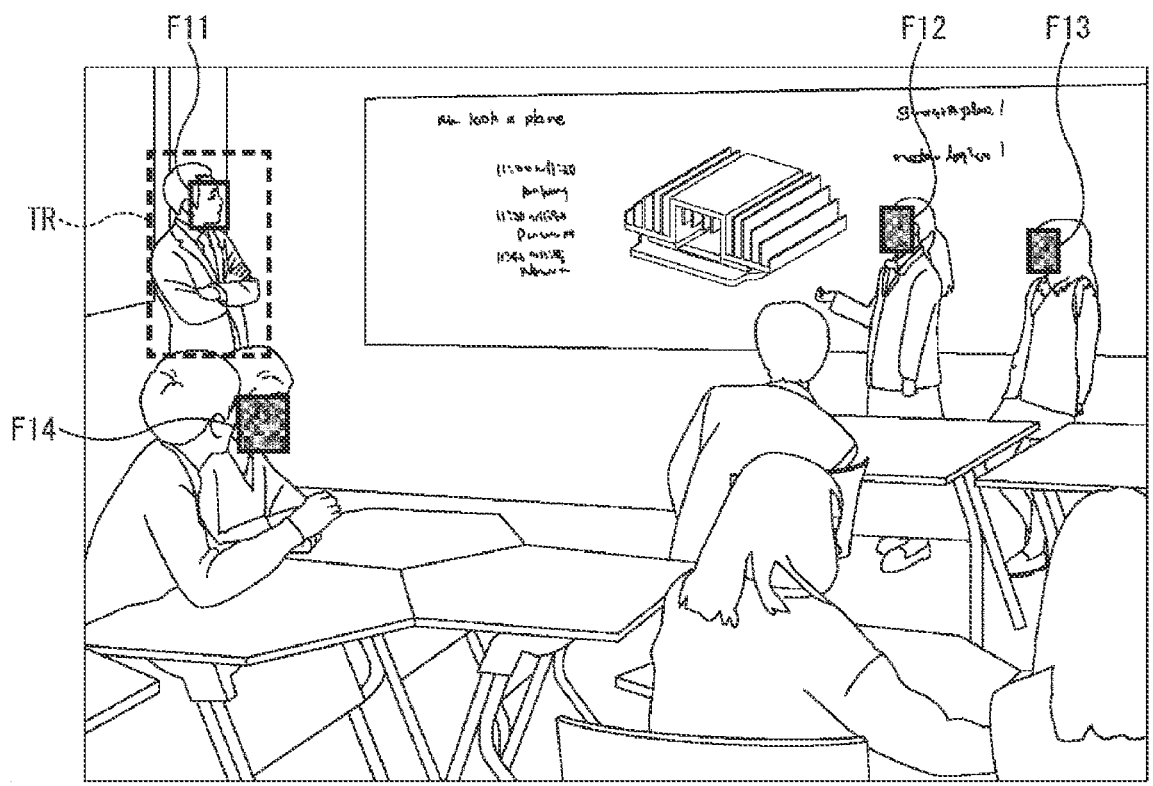
FIG. 8 is a diagram showing an example of a result of masking of face areas.

According to the above processing, as shown in FIG. 8, masking processing is omitted only from the face area of the lecturer who is the tracking target (face frame F11 having highest overlap rate with the tracking frame TR), and masking processing is performed on the face areas of the auditors (face frames F12, F13, F14). This makes it possible to protect the privacy of the auditor who is a subject other than the main subject more reliably and easily.

Note that while the face frames F11 to F14 and the tracking frame TR are shown in the dynamic image shown in FIG. 8, the face frames F11 to F14 and the tracking frame TR are not drawn in the dynamic image actually output from the control device 2, and only masking processing is applied to the face areas of the auditors.

In the processing described above, in consideration of the possibility of multiple face frames overlapping the tracking frame TR, a face frame located higher in the tracking frame TR may be preferentially identified as the face frame of a non-processing target (lecturer), for example. Additionally, the face frame of a non-processing target may be identified preferentially on the basis of both the overlap rate and the position of the face frame in the tracking frame TR. Moreover, the face frame of a non-processing target may be identified preferentially on the basis of the size, orientation, and motion vector of the tracking frame TR or the face frame.

Additionally, in the above-described processing, the tracking target is set as one lecturer and the one subject with the highest overlap rate is identified as a non-processing target. However, multiple subjects may be identified as non-processing targets. For example, a predetermined number of subjects may be identified as non-processing targets in descending order of overlap rate, or subjects whose overlap rate exceeds a predetermined threshold may be identified as non-processing targets.

<2-2. Second Configuration Example and Operation of Control Device>

(Configuration Example of Control Device)

Figure 9:
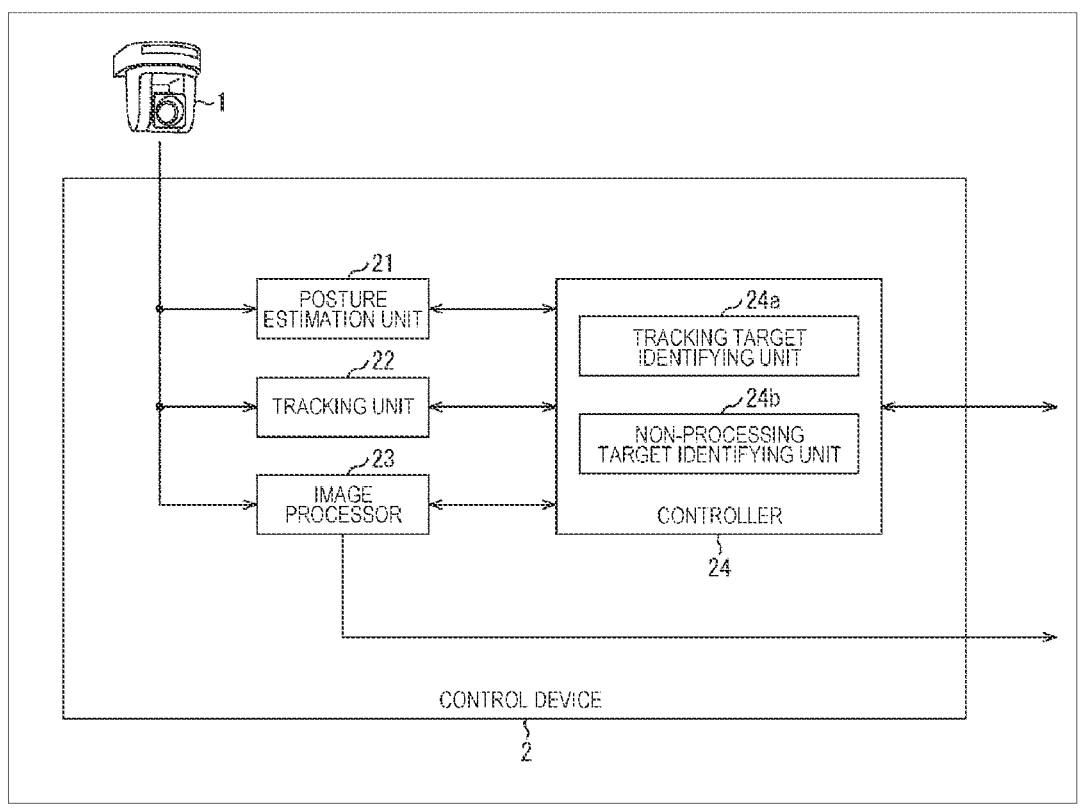
FIG. 9 is a block diagram showing a functional configuration example of the control device.

FIG. 9 is a block diagram showing another functional configuration example of the control device 2.

The control device 2 of FIG. 9 includes a posture estimation unit 21, a tracking unit 22, an image processor 23, and a controller 24. Note that the tracking unit 22 and the image processor 23 have similar functions as the tracking unit 12 and the image processor 13 of FIG. 4, and therefore descriptions are omitted.

The posture estimation unit 21 estimates the posture of a subject in a dynamic image from the camera 1 using a technology such as deep learning, and supplies posture information indicating the estimated posture to the controller 24. Posture information includes at least standing information indicating that the subject is standing and sitting information indicating that the subject is seated, for example. Posture information may be information including joint information indicating joints of a person appearing in a dynamic image and skeletal information connecting the pieces of joint information, or information including only one of these types of information.

Figure 10:
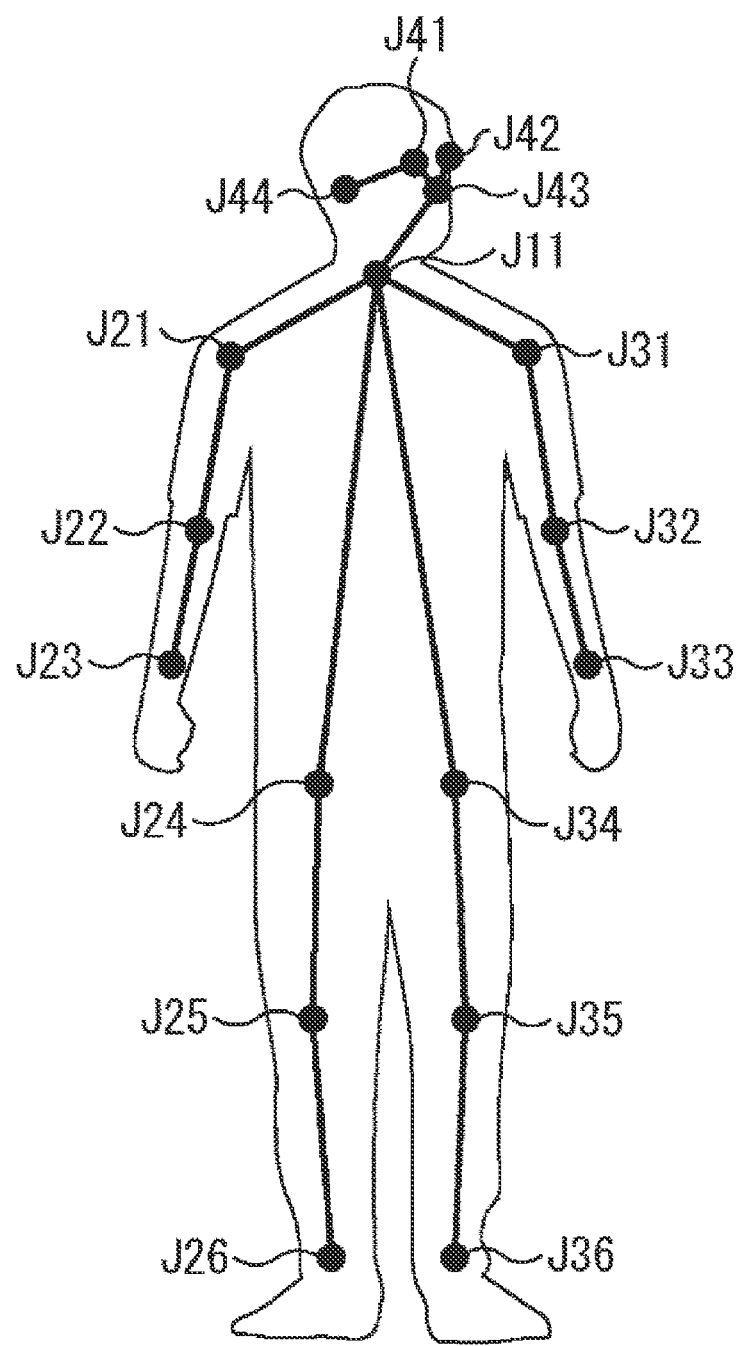
FIG. 10 is a diagram showing an example of posture information.

FIG. 10 is a diagram showing an example of posture information.

In FIG. 10, 14 pieces of joint information J11, J12, J21 to J26, J31 to J36 are indicated by points, and skeletal information connecting the pieces of joint information is indicated by line segments connecting two points.

In the example of FIG. 10, the joint information J11, J12 represent the head and neck of the human body, respectively. The joint information J21 to J23 represent the right shoulder, right elbow, and right wrist of the human body, respectively, and the joint information J24 to J26 represent the right hip joint, right knee, and right ankle of the human body, respectively. The joint information J31 to J33 represent the left shoulder, left elbow, and left wrist of the human body, respectively, and the joint information J34 to J36 represent the left hip joint, left knee, and left ankle of the human body, respectively.

Additionally, the posture information of FIG. 10 also includes face part information J41 to J44. The face part information J41, J42 represent the right eye and left eye, the face part information J43 represents the nose, and the face part information J44 represents the ear (right ear).

Returning to the description of FIG. 9, the controller 24 exchanges data with each of the posture estimation unit 21, the tracking unit 22, and the image processor 23, controls each unit, and outputs the result of each unit to the outside.

The controller 24 has a tracking target identifying unit 24a and a non-processing target identifying unit 24b. Note that the tracking target identifying unit 24a and the non-processing target identifying unit 24b have similar functions as the tracking target identifying unit 14a and the non-processing target identifying unit 14c of FIG. 4, and therefore description are omitted.

(Operation of Control Device)

Figure 11:
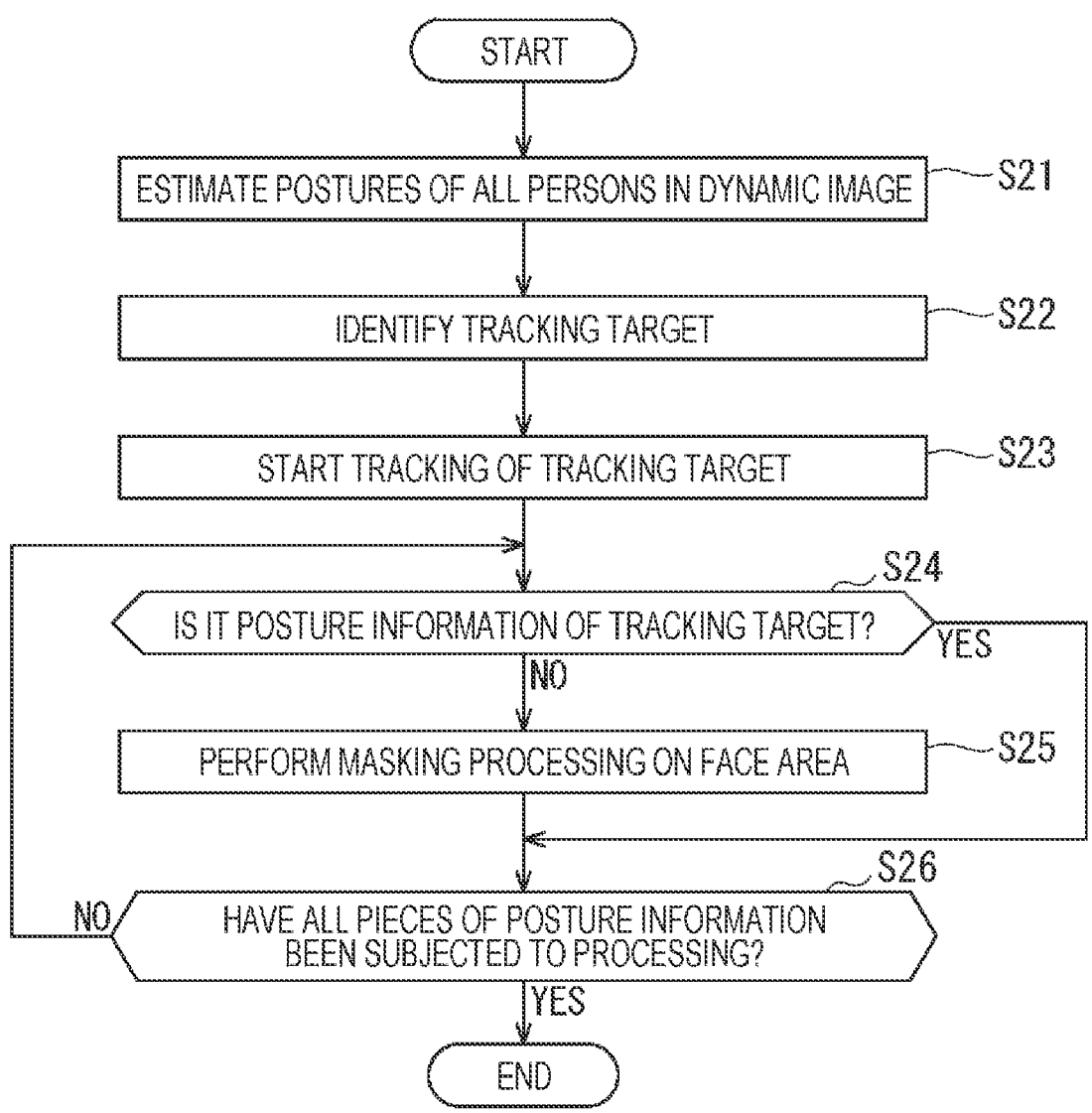
FIG. 11 is a flowchart for describing masking processing of a face area.

Next, an example of masking processing of the face area of an auditor by the control device 2 of FIG. 9 will be described with reference to a flowchart of FIG. 11.

In step S21, the posture estimation unit 21 is controlled by the controller 24 to estimate the postures of all persons in a dynamic image from the camera 1.

In step S22, the tracking target identifying unit 24a identifies the tracking target of the tracking unit 22 in the dynamic image from the camera 1. For example, the tracking target identifying unit 24a identifies a person whose posture is estimated in the preset position (frame PS) described with reference to FIG. 7 as the tracking target of the tracking unit 22.

In step S23, the tracking unit 22 is controlled by the controller 24 to start tracking the tracking target identified by the tracking target identifying unit 24a. Here, the tracking unit 22 is not limited to matching areas of similar colors and shapes between frames of the dynamic image, and may track posture information obtained as a result of posture estimation by the posture estimation unit 21 between frames of the dynamic image.

In step S24, the non-processing target identifying unit 24b determines whether or not one piece of posture information of interest (focused posture information) is posture information of the tracking target.

If it is determined, in step S24, that the focused posture information is not posture information of the tracking target, the processing proceeds to step S25.

In step S25, the image processor 23 is controlled by the controller 24 to perform masking processing on the face area of a subject in a posture indicated by the focused posture information. As described above, since posture information also includes face part information, the image processor 23 can specify the face area on the basis of posture information.

On the other hand, if it is determined, in step S24, that the focused posture information is posture information of the tracking target, step S25 is skipped. Specifically, the non-processing target identifying unit 24b identifies the subject having the posture represented by the focused posture information as a non-processing target, and the image processor 23 does not perform masking processing on the face area of the subject identified as a non-processing target.

Thereafter, in step S26, it is determined whether or not all pieces of posture information have been subjected to processing. If not all pieces of posture information have been subjected to processing, the processing returns to step S24, and the processing of steps S24 and S25 are repeated.

According to the above processing, masking processing is omitted only from the face area of the lecturer who is the tracking target, and masking processing is performed on the face areas of the auditors. This makes it possible to protect the privacy of the auditor who is a subject other than the main subject more reliably and easily.

<2-3. Third Configuration Example and Operation of Control Device>

(Configuration Example of Control Device)

Figure 12:
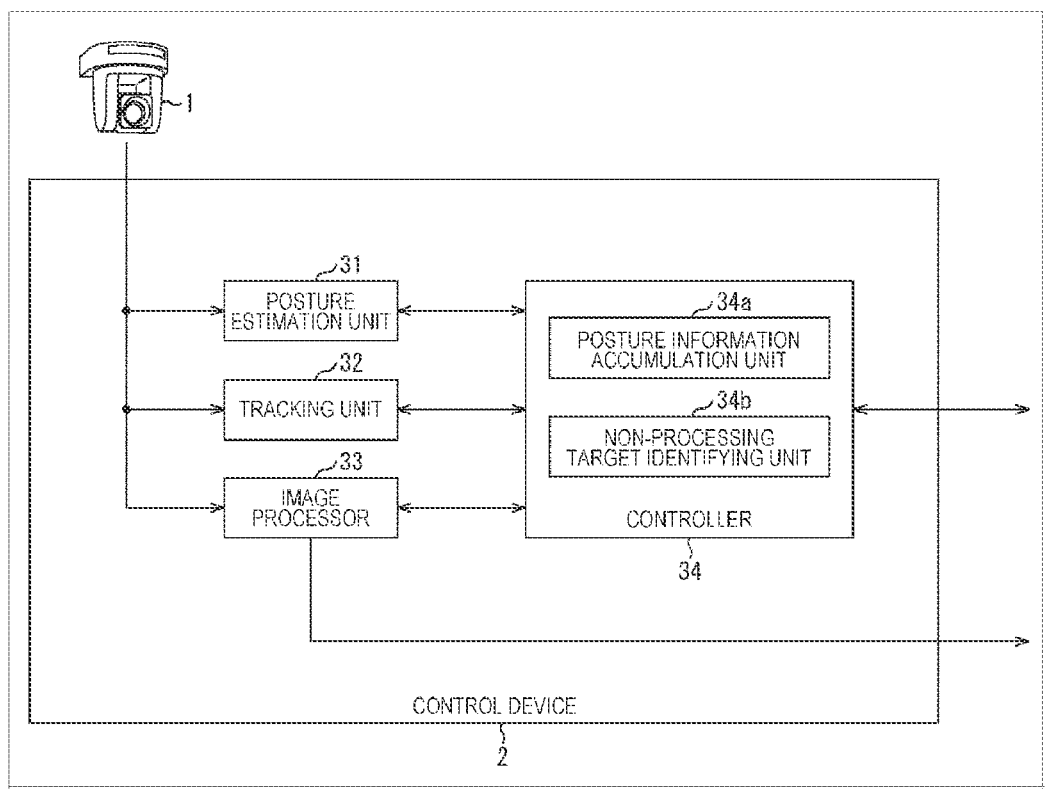
FIG. 12 is a block diagram showing a functional configuration example of the control device.

FIG. 12 is a block diagram showing yet another functional configuration example of the control device 2.

The control device 2 of FIG. 12 includes a posture estimation unit 31, a tracking unit 32, an image processor 33, and a controller 34. Note that the posture estimation unit 31, the tracking unit 32, and the image processor 33 have similar functions as the posture estimation unit 21, the tracking unit 22, and the image processor 23 of FIG. 9, and therefore descriptions are omitted.

The controller 34 exchanges data with each of the posture estimation unit 31, the tracking unit 32, and the image processor 33, controls each unit, and outputs the result of each unit to the outside.

The controller 34 has a posture information accumulation unit 34a and a non-processing target identifying unit 34b. Note that the non-processing target identifying unit 34b has a similar function as the non-processing target identifying unit 24b of FIG. 9, and therefore description is omitted.

The posture information accumulation unit 34a sequentially accumulates posture information from the posture estimation unit 31. The accumulated posture information is read by the non-processing target identifying unit 34b as necessary as a history of posture information of a subject in a dynamic image from the camera 1.

(Operation of Control Device)

Next, an example of masking processing of the face area of an auditor by the control device 2 of FIG. 12 will be described with reference to a flowchart of FIG. 13.

In lectures and the like, lecturers give lectures mainly by standing in a specific position such as a platform, and auditors often sit and listen to the lectures. Accordingly, a subject in a specific position can be regarded as a lecturer, and other subjects can be regarded as auditors.

Note, however, that the lecturer may sometimes leave the specific position or the auditor may stand in the specific position with a question and answer session, for example. Hence, in the following, an example will be described in which, based on the history of posture information of each subject, a subject that is in a specific position for a long time is regarded as a lecturer, and other subjects are regarded as auditors.

In step S31, the posture estimation unit 31 is controlled by the controller 34 to estimate the postures of all persons in a dynamic image from the camera 1.

In step S32, the tracking unit 32 is controlled by the controller 34 to start tracking all persons whose postures are estimated. Here, the tracking unit 32 may perform tracking by matching areas of similar colors and shapes between frames of the dynamic image, or may track posture information obtained as a result of posture estimation by the posture estimation unit 31 between frames of the dynamic image.

In step S33, the posture information accumulation unit 34a accumulates posture information obtained as a result of posture estimation from the posture estimation unit 31. For example, the posture information accumulation unit 34a counts, in units of a predetermined number of frames such as 10 frames, whether or not each subject in the posture indicated by the posture information is in a specific area.

Here, the specific area is the range centered on the classroom blackboard and platform (teacher's desk) indicated by the preset position (frame PS) described with reference to FIG. 7.

Thereafter, when a predetermined time passes, the non-processing target identifying unit 34b determines, in step S34, with respect to one piece of posture information of interest (focused posture information), whether or not the subject has been located in the specific area for a predetermined time or more. For example, depending on whether or not the count value counted in units of the predetermined number of frames exceeds a predetermined value, the non-processing target identifying unit 34b adds to the subject a flag indicating whether or not the subject of the focused posture information is located in the specific area for the predetermined time or more.

If it is not determined, in step S34, that the subject of the focused posture information is located in the specific area for the predetermined time or more, the processing proceeds to step S35.

In step S35, the image processor 33 is controlled by the controller 34 to perform masking processing on the face area of a person in the posture indicated by the focused posture information. As described above, since posture information also includes face part information, the image processor 33 can identify the face area on the basis of posture information.

On the other hand, if it is determined, in step S34, that the subject of the focused posture information is located in the specific area for the predetermined time or more, step S35 is skipped. Specifically, the non-processing target identifying unit 34b identifies a subject flagged as located in the specific area for the predetermined time or more as a non-processing target, and the image processor 33 does not perform masking processing on the face area of the flagged subject.

Thereafter, in step S36, it is determined whether or not all pieces of posture information have been subjected to processing. If not all pieces of posture information have been subjected to processing, the processing returns to step S34, and the processing of steps S34 and S35 are repeated.

Note that the above-described flag may be reset at predetermined timing. The predetermined timing is timing at which lecture start information indicating the start of a lecture is acquired. Lecture start information may be information that detects that a lecture bell has sounded, or may be time information indicating the start time of a lecture. Time information indicating the start time of a lecture may be specified on the basis of schedule information prepared in advance, or may be specified by detecting, from a dynamic image or voice information corresponding to a dynamic image, that a predetermined number or more students (auditors) have entered an empty classroom.

According to the above processing, a subject located in a specific area centered on a platform for a predetermined time or more is regarded as a lecturer, and masking processing is not performed on the face of the lecturer. Other subjects are regarded as auditors, and masking processing is performed on the face areas of the auditors. This makes it possible to protect the privacy of the auditor who is a subject other than the main subject more reliably and easily.

In the above-described processing, the subject in the specific area is regarded as a lecturer, and the one subject is identified as a non-processing target. However, multiple subjects may be identified as non-processing targets. For example, a predetermined number of subjects may be identified as non-processing targets in descending order of time spent in the specific area, or subjects whose time spent in the specific area exceed a predetermined threshold may be identified as non-processing targets. Additionally, the time spent in the specific area may be an absolute time, or may be a ratio (proportion) to the time in which the subject spends outside the specific area.

The specific area is not limited to the range indicated by the preset position described above, and may be an area designated by the user. The area designated by the user may be designated by a rectangular frame as similar to the case of the preset position, or may be designated by an arbitrary shape. Moreover, in addition to designating the specific area by the user, the specific area may be set by estimating the area where the lecturer is frequently in, such as a platform, using a technology such as general object recognition and semantic segmentation. Additionally, statistics of the place where the lecturer is in may be collected, and a specific area may be set on the basis of the result.

(Operation of Control Device)

Next, another example of masking processing of an auditor by the control device 2 of FIG. 12 will be described with reference to a flowchart of FIG. 14.

In lectures and the like, lecturers give lectures mainly by standing on a platform, for example, and auditors often sit and listen to the lectures. Accordingly, a standing subject can be regarded as a lecturer, and a sitting subject can be regarded as an auditor.

Note, however, that, the lecturer may sometimes sit down, or the auditor may stand up with a question and answer session, for example. Hence, in the following, an example will be described in which, based on the history of posture information of each subject, a subject standing for a long time is regarded as a lecturer, and other subjects are regarded as auditors.

Figure 13:
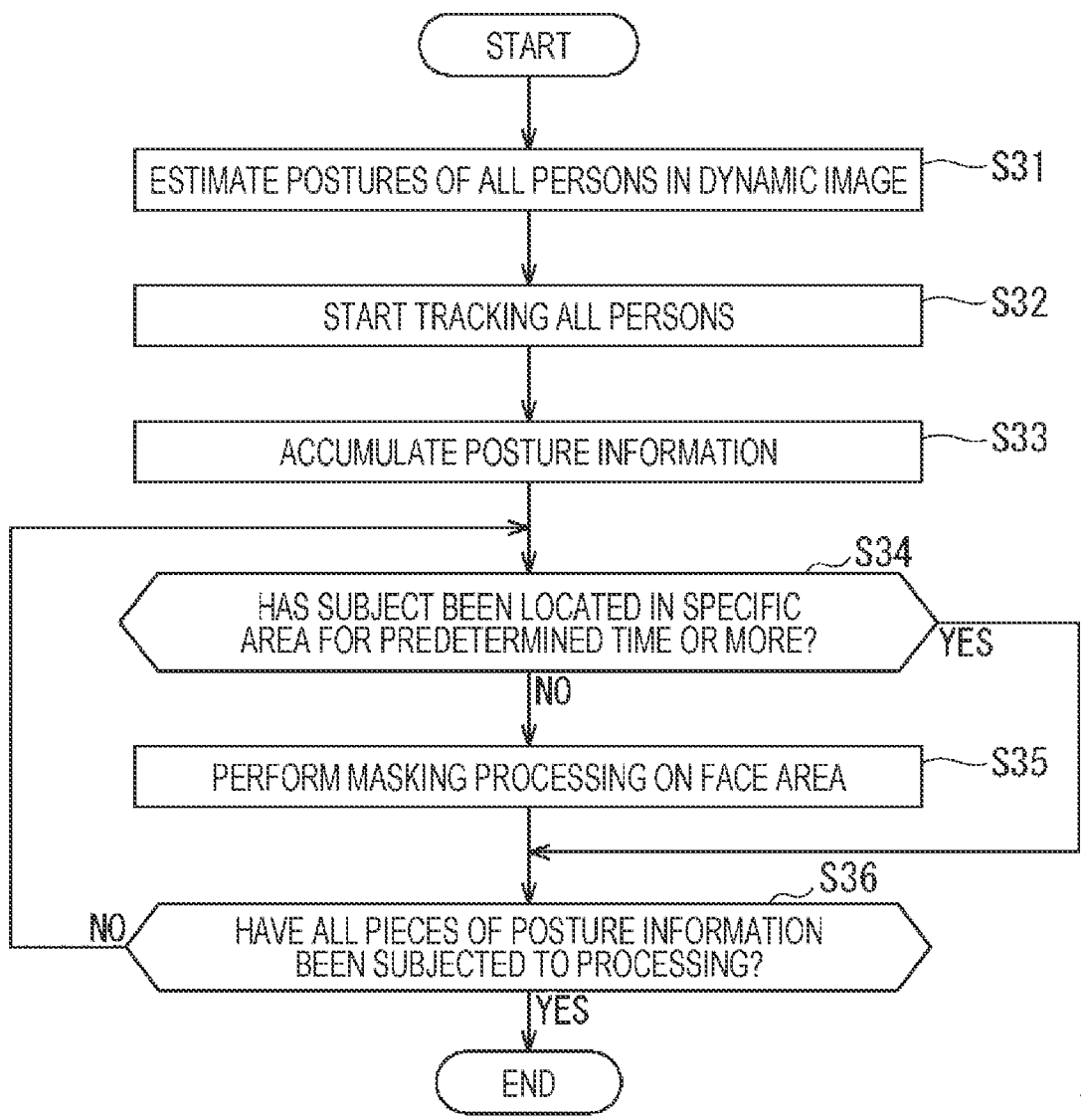
FIG. 13 is a flowchart for describing masking processing of a face area.
Figure 14:
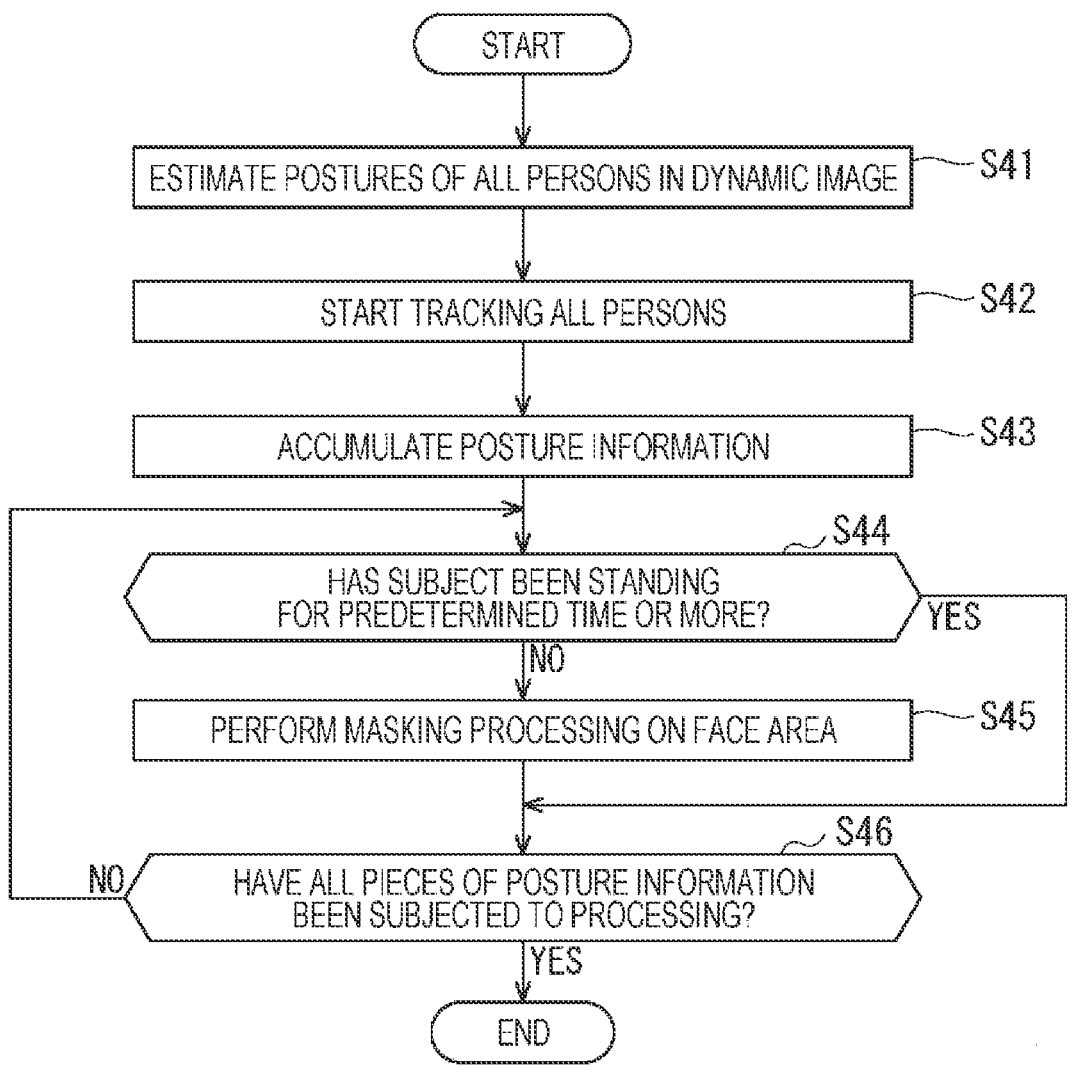
FIG. 14 is a flowchart for describing masking processing of the face area.

Note that the processing in steps S41 and S42 in the flowchart of FIG. 14 are similar to the processing in steps S31 and S32 in the flowchart of FIG. 13, and therefore description is omitted.

That is, in step S43, the posture information accumulation unit 34a accumulates posture information obtained as a result of posture estimation from the posture estimation unit 31. For example, the posture information accumulation unit 34a counts, in units of a predetermined number of frames such as 10 frames, whether or not each subject in the posture indicated by the posture information maintains a specific posture for a predetermined time or more, specifically, whether the subject is standing or sitting for a predetermined time or more.

Thereafter, when a predetermined time passes, the non-processing target identifying unit 34b determines, in step S44, with respect to one piece of posture information of interest (focused posture information), whether or not the subject has been standing for a predetermined time or more. For example, depending on whether or not the count value counted in units of the predetermined number of frames exceeds a predetermined value, the non-processing target identifying unit 34b adds to the subject a flag indicating whether or not the subject of the focused posture information has been standing for the predetermined time or more.

If it is not determined, in step S44, that the subject of the focused posture information has been standing for a predetermined time or more, the processing proceeds to step S45.

In step S45, the image processor 33 is controlled by the controller 34 to perform masking processing on the face area of a person in the posture indicated by the focused posture information. As described above, since posture information also includes face part information, the image processor 33 can identify the face area on the basis of posture information.

On the other hand, if it is determined, in step S44, that the subject of the focused posture information has been standing for a predetermined time or more, step S45 is skipped. Specifically, the non-processing target identifying unit 34*b* identifies a subject flagged as standing for the predetermined time or more as a non-processing target, and the image processor 33 does not perform masking processing on the face area of the flagged subject.

Thereafter, in step S46, it is determined whether or not all pieces of posture information have been subjected to processing. If not all pieces posture information have been subjected to processing, the processing returns to step S44, and the processing of steps S44 and S45 are repeated.

According to the above processing, a subject who has maintained a specific posture (standing) for a predetermined time or more is regarded as a lecturer, the masking processing is not performed on the face area of the lecturer. Other subjects are regarded as auditors, and masking processing is performed on the face area of the auditors. This makes it possible to protect the privacy of the auditor who is a subject other than the main subject more reliably and easily.

In the processing described above, the subject with the longest standing time is regarded as a lecturer, and the one subject is identified as a non-processing target. However, multiple subjects may be identified as non-processing targets. For example, a predetermined number of subjects may be identified as non-processing targets in descending order of standing time, or subjects whose standing time exceed a predetermined threshold may be identified as non-processing targets. Additionally, the standing time may be an absolute time, or may be a ratio (proportion) to the time in which the subject is taking a posture other than standing.

Note that in the examples of FIGS. 13 and 14, the dynamic image from the camera 1 is subjected to masking processing in real time. However, by using the accumulated posture information of all subjects, after recording a dynamic image, the recorded dynamic image can be subjected to masking processing.

In the above, the configuration in which image processing (masking processing) is performed on the face area of a subject other than the main subject has been described. Moreover, by subjecting a voice corresponding to the speech sound of a subject other than the main subject to predetermined voice processing, the speech sound of the main subject can be made clear while protecting the privacy of the auditor who is a subject other than the main subject.

3. Configuration of Image Capturing System According to Second Embodiment

Figure 15:
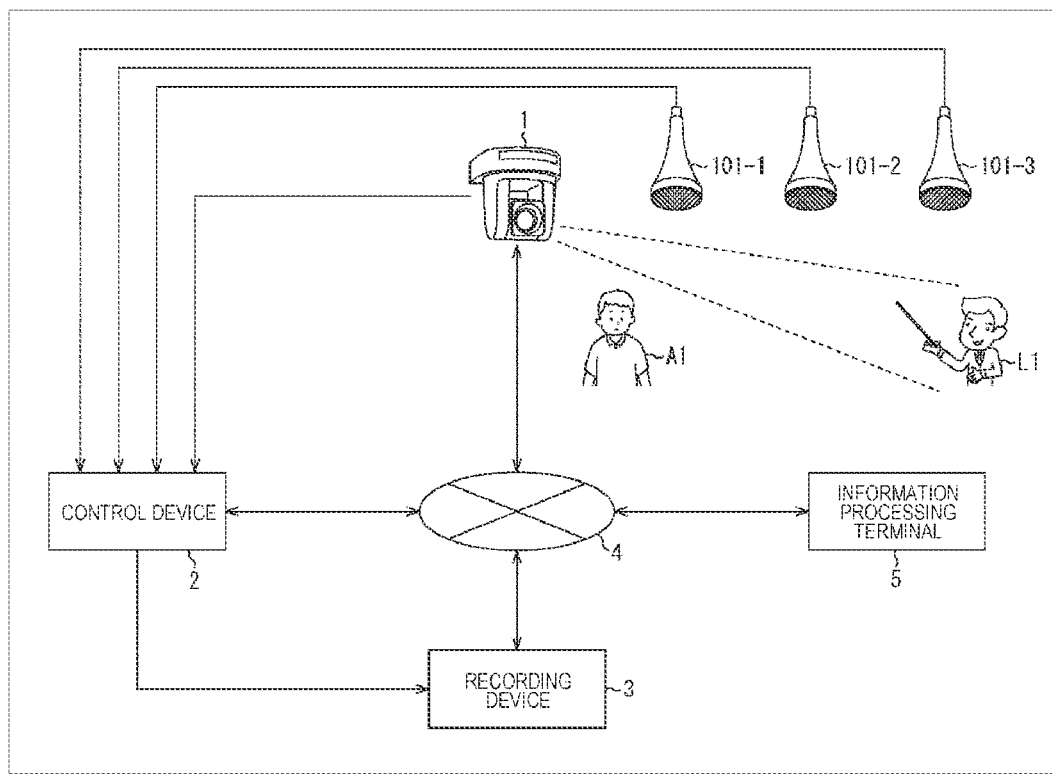
FIG. 15 is a block diagram showing another configuration example of the image capturing system.

FIG. 15 is a diagram showing a configuration example of an image capturing system according to a second embodiment of the present disclosure.

An image capturing system of FIG. 15 includes microphones 101-1, 101-2, 101-3 (hereinafter also simply referred to as microphone 101) in addition to a similar configuration as the image capturing system of FIG. 1. While three microphones 101 are provided in the example of FIG. 15, the number of multiple microphones 101 does not necessarily have to be three.

The microphone 101 is configured as a voice input unit that inputs voices such as speech sounds of a lecturer L1 and an auditor A1, and is installed in multiple locations in a classroom or a lecture hall where lectures are given. Voice input to the microphone 101 is output to a control device 2.

The control device 2 of FIG. 15 performs predetermined voice processing on a voice output from the microphone 101 on the basis of an instruction input from an information processing terminal 5 or the like. The voice that has undergone voice processing is output to a recording device 3 or output to the information processing terminal 5 through a network 4.

<3-1. First Configuration Example and Operation of Control Device>
(Configuration Example of Control Device)

Figure 16:
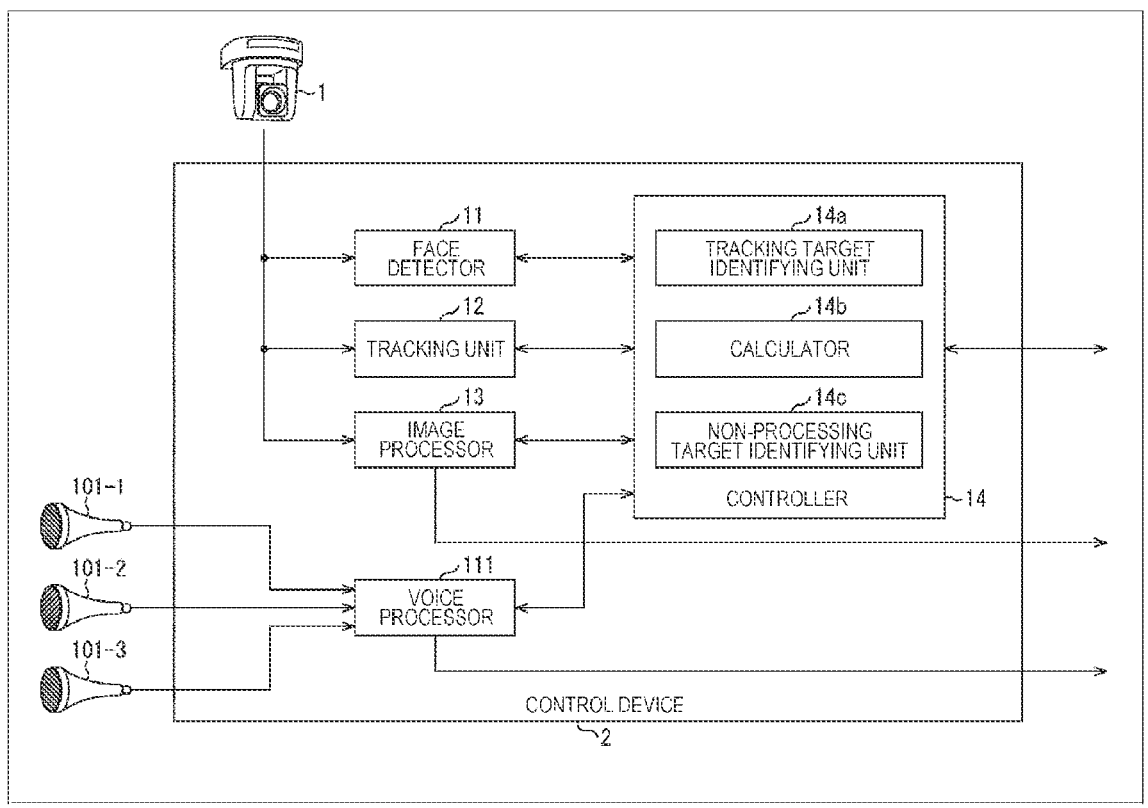
FIG. 16 is a block diagram showing a functional configuration example of the control device.

FIG. 16 is a block diagram showing a functional configuration example of the control device 2 of FIG. 15.

The control device 2 of FIG. 16 includes a voice processor 111 in addition to a similar configuration as the control device 2 of FIG. 4.

A non-processing target identifying unit 14*c* of FIG. 16 identifies a microphone 101 that is in a predetermined positional relationship with the main subject among the multiple microphones 101 as a non-processing target (non-processing target microphone) that is not subjected to predetermined voice processing.

The voice processor 111 suppresses output of a voice input from microphones 101 other than the microphone 101 which is the non-processing target (non-processing target microphone). Hereinafter, to suppress output of voice input from the microphone 101 is also referred to as performing masking processing on the voice.
(Operation of Control Device)

Next, an example of masking processing of the voice of an auditor by the control device 2 of FIG. 16 will be described with reference to a flowchart of FIG. 17.

Figure 5:
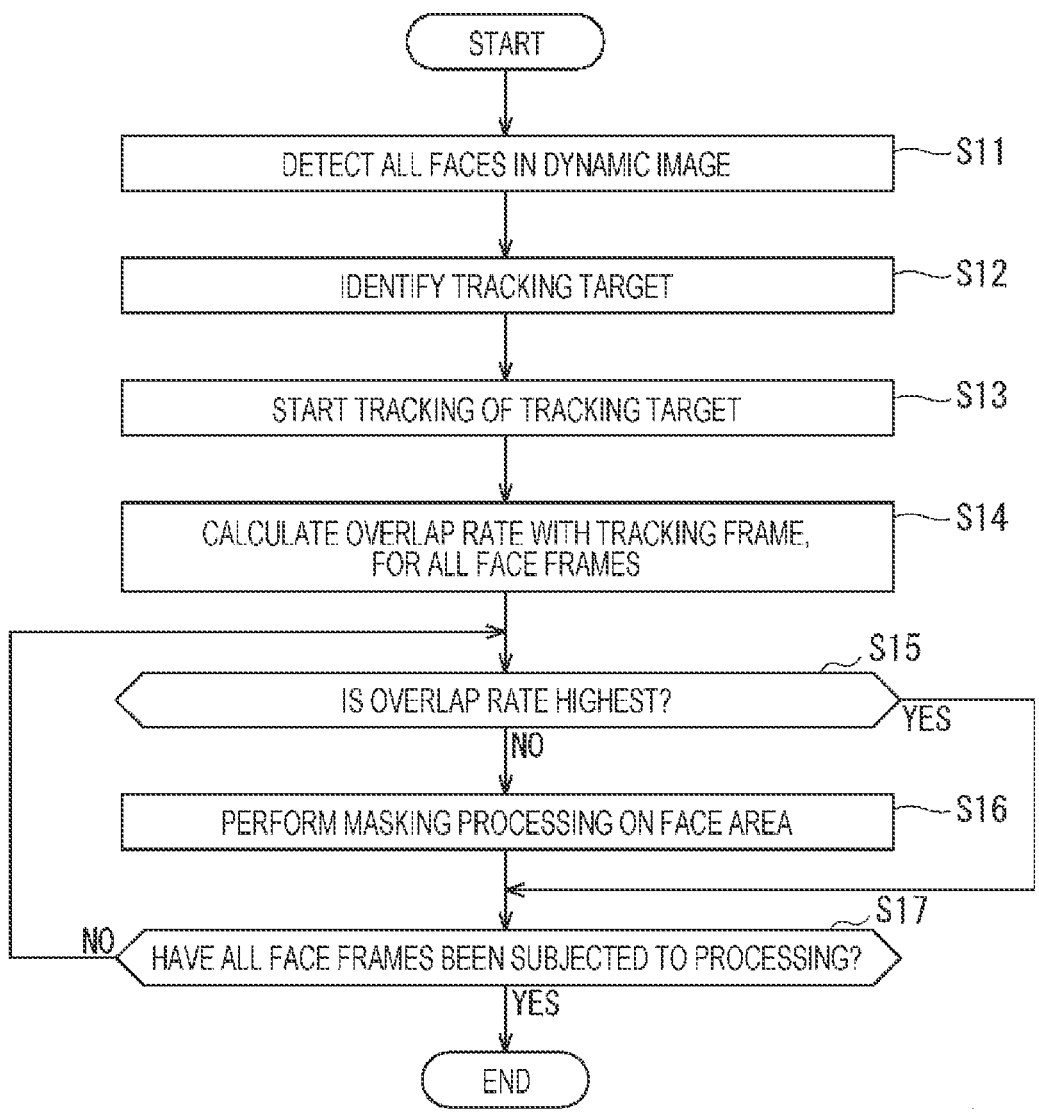
FIG. 5 is a flowchart for describing masking processing of a face area.
Figure 17:
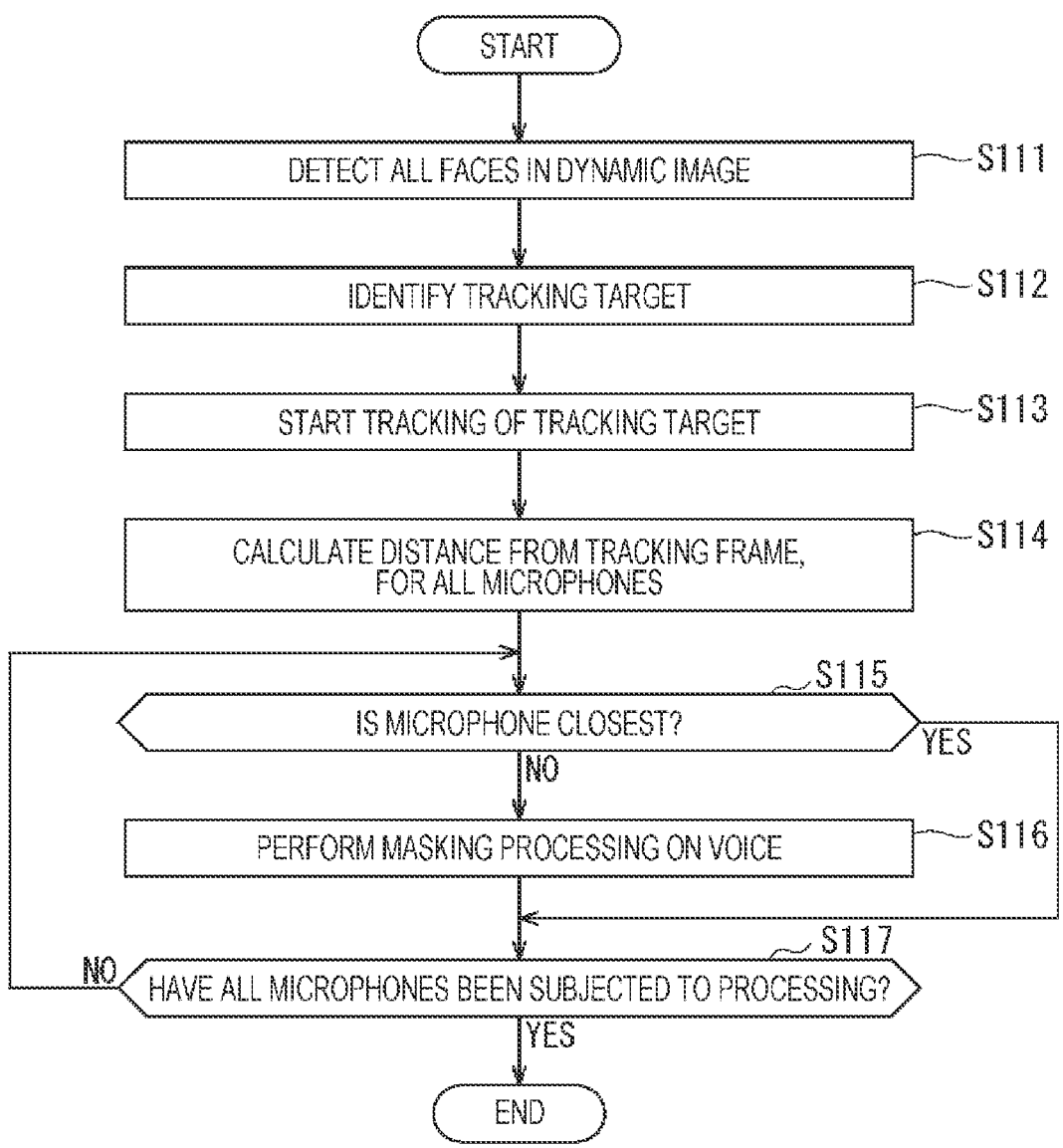
FIG. 17 is a flowchart for describing masking processing of a voice.

Note that the processing in steps S111 to S113 in the flowchart of FIG. 17 is similar to the processing in steps S11 to S13 in the flowchart of FIG. 5, and therefore description is omitted. Additionally, the processing of step S114 and subsequent steps in the flowchart of FIG. 17 is performed in parallel with the processing of step S14 and subsequent steps in the flowchart of FIG. 5.

That is, when the tracking of the lecturer who is the tracking target is started, a calculator 14*b* calculates, in step S114, the distance from the tracking frame TR (lecturer to be tracked) for all the microphones 101. Incidentally, it is assumed that the position where the microphone 101 is actually installed and the position of the microphone 101 in a dynamic image from the camera 1 are associated in advance by a predetermined method.

In step S115, the non-processing target identifying unit 14*c* determines whether or not one microphone 101 of interest (focused microphone) is closest to the tracking frame TR.

If it is not determined, in step S115, that the distance between the focused microphone and the tracking frame TR is the shortest, the processing proceeds to step S116.

In step S116, the voice processor 111 is controlled by a controller 14 to perform masking processing on a voice input from the focused microphone.

On the other hand, if it is determined, in step S115, that the distance between the focused microphone and the tracking frame TR is the shortest, step S116 is skipped. Specifically, the microphone 101 having the shortest distance to the tracking frame TR is identified as a non-processing target, and the voice processor 111 does not perform masking processing on the voice input from the microphone 101 identified as the non-processing target.

Thereafter, in step S117, it is determined whether or not all microphones 101 have been subjected to processing. If not all microphones 101 have been subjected to processing, the processing returns to step S115, and the processing of steps S115 and S116 are repeated.

According to the above processing, masking processing is omitted only from the voice input from the microphone 101 closest to the lecturer who is the tracking target, and masking processing is performed on the voice input from other microphones 101. As a result, the speech sound of the lecturer who is the main subject can be made clear while protecting the privacy of the auditor who is a subject other than the main subject.

Next, another example of masking processing of the voice of an auditor by the control device 2 of FIG. 16 will be described with reference to a flowchart of FIG. 18.

Figure 18:
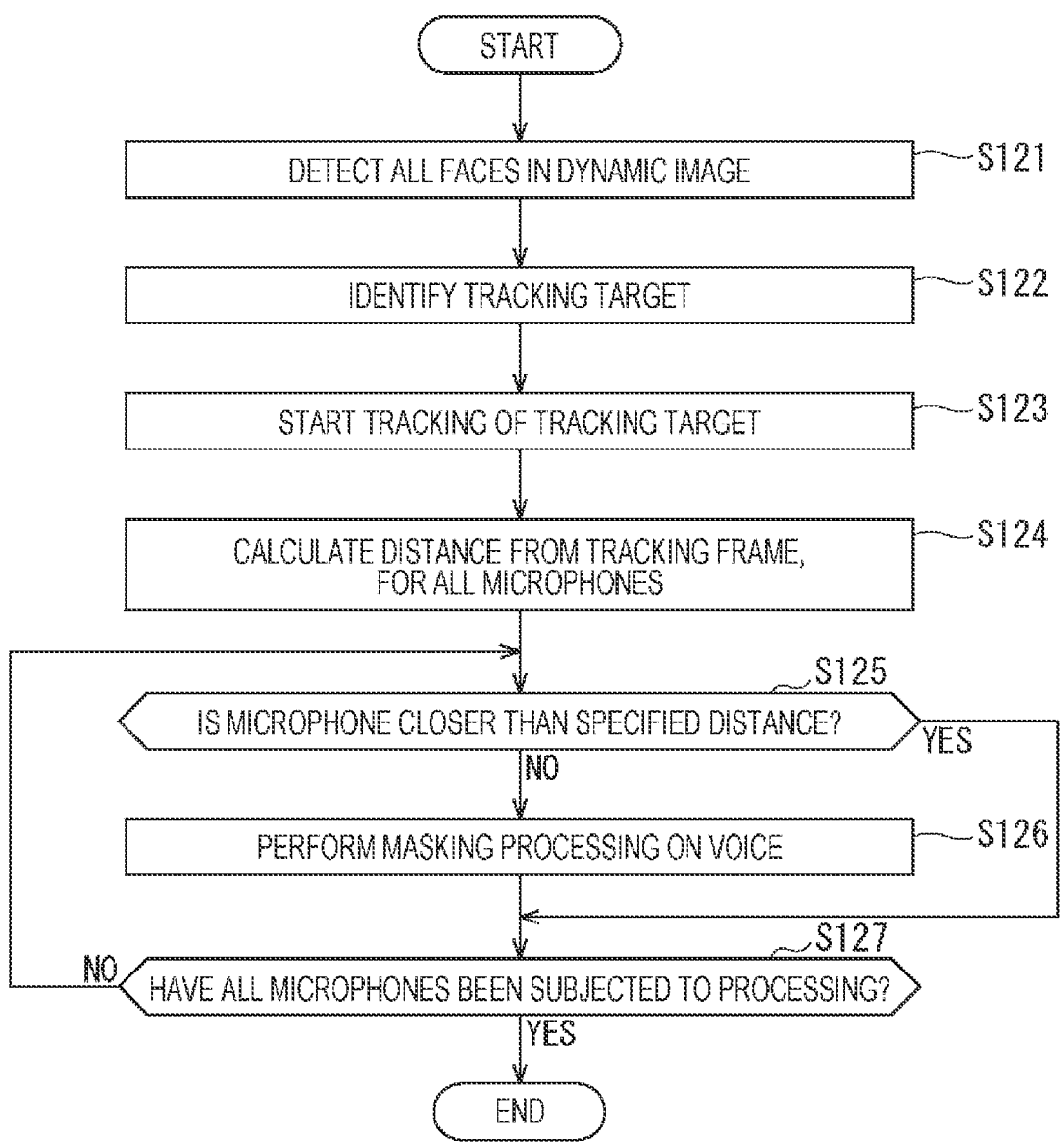
FIG. 18 is a flowchart for describing masking processing of the voice.

Note that the processing in steps S121 to S124 in the flowchart of FIG. 18 is similar to the processing in steps S111 to S114 in the flowchart of FIG. 17, and therefore description is omitted.

That is, when the distance from the tracking frame TR is calculated for all the microphones 101, the non-processing target identifying unit 14c determines, in step S125, whether or not the distance of one microphone 101 of interest (focused microphone) from the tracking frame TR is shorter than a specified distance.

If it is not determined, in step S125, that the distance between the focused microphone and the tracking frame TR is shorter than the specified distance, the processing proceeds to step S126.

In step S126, the voice processor 111 is controlled by the controller 14 to perform masking processing on a voice input from the focused microphone.

On the other hand, if it is determined, in step S125, that the distance between the focused microphone and the tracking frame TR is shorter than the specified distance, step S126 is skipped. Specifically, the microphone 101 that is closer than a specified distance to the tracking frame TR is identified as a non-processing target, and the voice processor 111 does not perform masking processing on the voice input from the microphone 101 identified as the non-processing target.

Thereafter, in step S127, it is determined whether or not all microphones 101 have been subjected to processing. If not all microphones 101 have been subjected to processing, the processing returns to step S125, and the processing of steps S125 and S126 are repeated.

According to the above processing, masking processing is omitted only from the voice input from the microphone 101 that is closer than a specified distance to the lecturer who is the tracking target, and masking processing is performed on the voice input from other microphones 101. As a result, the speech sound of the lecturer who is the main subject can be made clear while protecting the privacy of the auditor who is a subject other than the main subject.

Note that in the above-described processing, in a case where there is no microphone 101 that is closer than a specified distance to the lecturer who is the tracking target, output of voice input from all the microphones 101 is suppressed.

<3-2. Second Configuration Example and Operation of Control Device>
(Configuration Example of Control Device)

Figure 19:
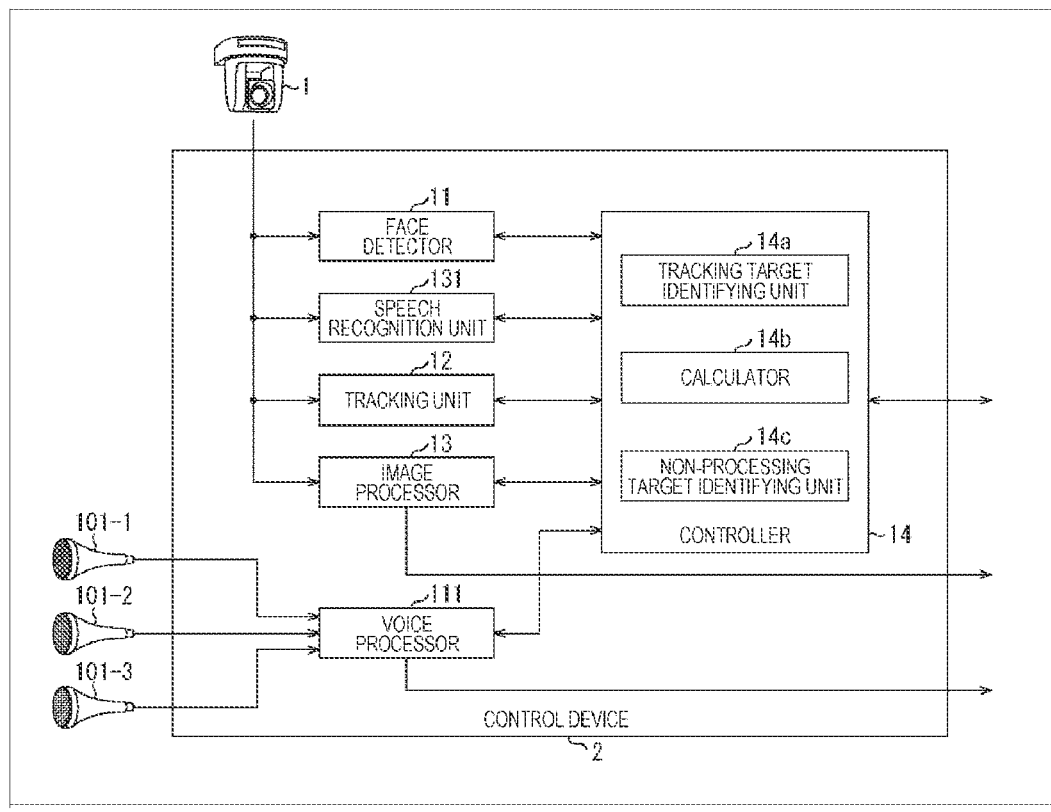
FIG. 19 is a block diagram showing a functional configuration example of the control device.

FIG. 19 is a block diagram showing another functional configuration example of the control device 2 of FIG. 15.

The control device 2 of FIG. 19 includes a speech recognition unit 131 in addition a similar configuration as the control device 2 of FIG. 16.

The speech recognition unit 131 recognizes speech of a subject that is the tracking target of the tracking unit 12 in a dynamic image from the camera 1.

Figure 20:
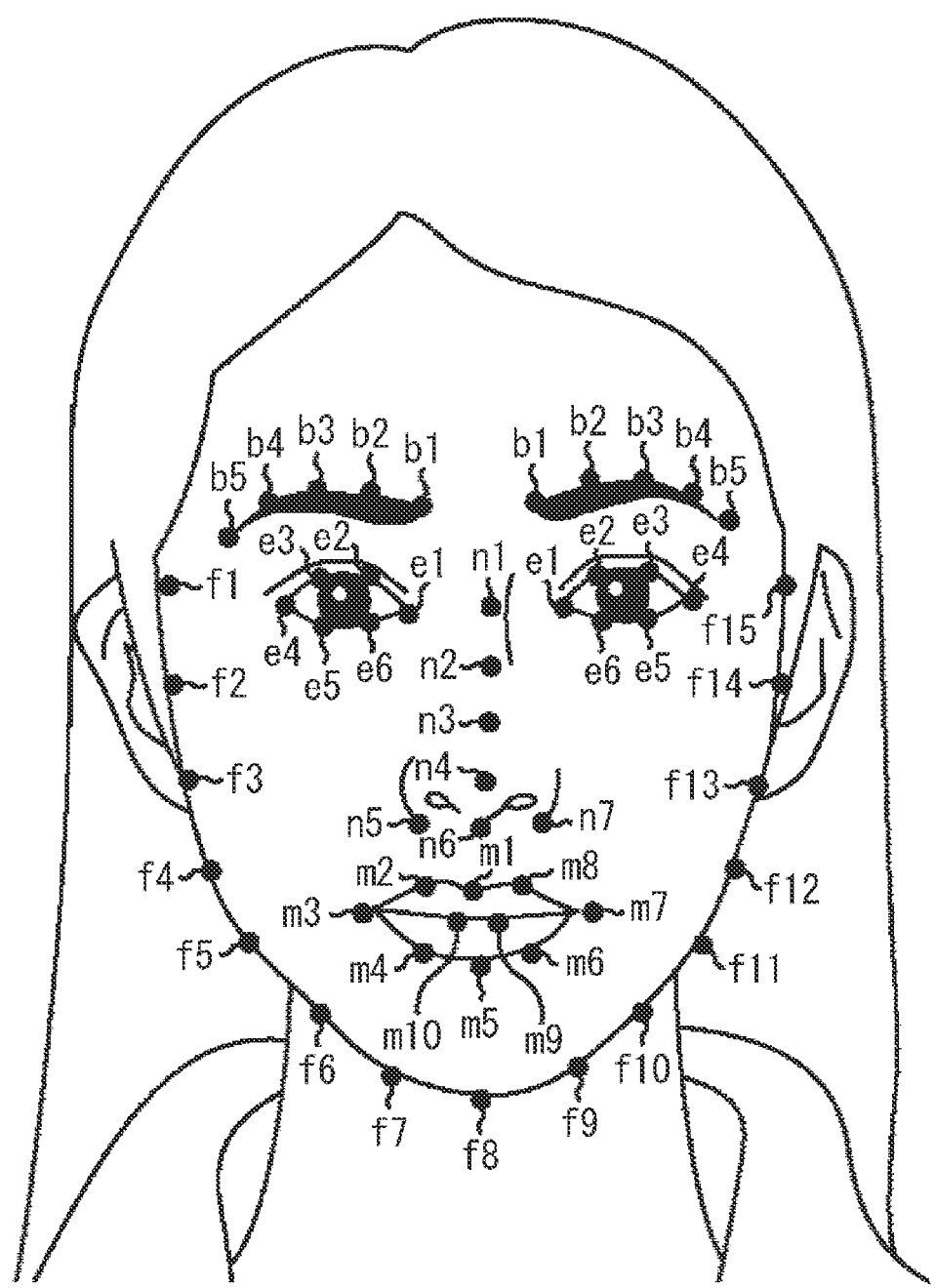
FIG. 20 is a diagram for describing speech recognition.

For example, as shown in FIG. 20, the speech recognition unit 131 extracts feature points (contour points) of the face and face parts in the face of a subject in a dynamic image. In the example of FIG. 20, facial contour points f1 to f15, left and right eyebrow feature points b1 to b5, left and right eye feature points e1 to e6, nose feature points n1 to n7, and lip feature points m1 to m10 are extracted.

Then, the speech recognition unit 131 recognizes speech of the subject by analyzing the movement of the lip feature points m1 to m10 among the extracted feature points.
(Operation of Control Device)

Next, an example of masking processing of the voice of an auditor by the control device 2 of FIG. 19 will be described with reference to a flowchart of FIG. 21.

Figure 21:
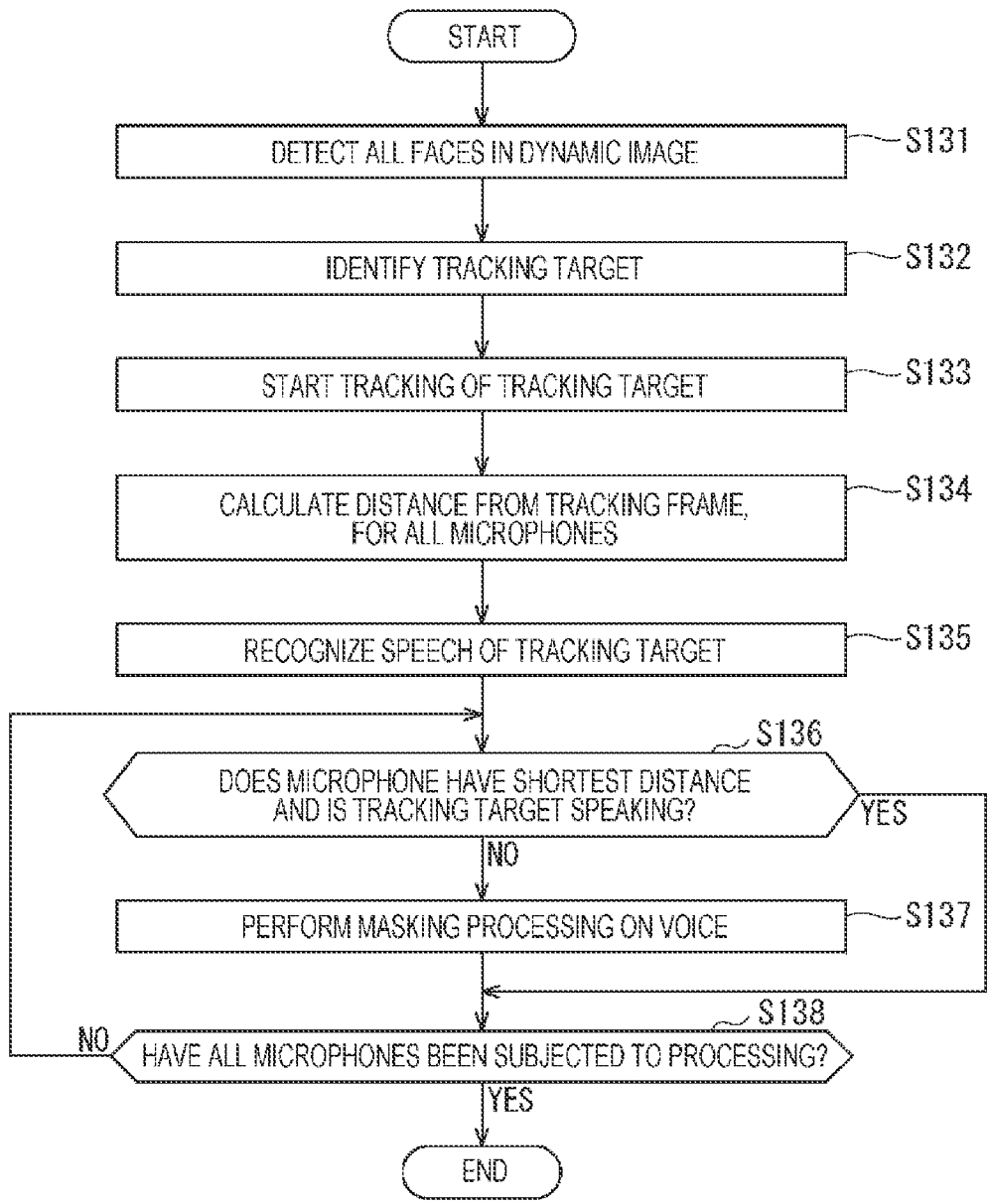
FIG. 21 is a flowchart for describing masking processing of a voice.

Note that the processing in steps S131 to S134 in the flowchart of FIG. 21 is similar to the processing in steps S111 to S114 in the flowchart of FIG. 17, and therefore description is omitted.

That is, when the distance from the tracking frame TR is calculated for all the microphones 101, the speech recognition unit 131 recognizes, in step S135, speech of the tracking target.

In step S136, the non-processing target identifying unit 14c determines whether or not one microphone 101 of interest (focused microphone) is closest to the tracking frame TR and the tracking target is speaking.

If it is not determined, in step S136, that the distance from the tracking frame TR is the shortest and the tracking target is speaking, that is, if either the distance between the focused microphone and the tracking frame TR is not the shortest or the tracking target is not speaking, the processing proceeds to step S137.

In step S137, the voice processor 111 is controlled by the controller 14 to perform masking processing on the voice input from the focused microphone.

On the other hand, if it is determined, in step S136, that the distance from the tracking frame TR is the shortest and the tracking target is speaking, step S137 is skipped. Specifically, during a period in which the tracking target is recognized to be speaking, the non-processing target identifying unit 14c identifies the microphone 101 having the shortest distance from the tracking frame TR as a non-processing target, and the voice processor 111 does not perform masking processing on the voice input from the microphone 101 identified as the non-processing target.

Thereafter, in step S138, it is determined whether or not all microphones 101 have been subjected to processing. If not all microphones 101 have been subjected to processing, the processing returns to step S136, and the processing of steps S136 and S137 are repeated.

According to the above processing, while the lecturer who is the tracking target is speaking, masking processing is omitted only from the voice input from the microphone 101 closest to the lecturer, and masking processing is performed on the voice input from other microphones 101. As a result, the speech sound of the lecturer who is the main subject can be made clear while protecting the privacy of the auditor who is a subject other than the main subject.

Note that while it is determined, in the above-described processing, whether or not the distance to the tracking frame TR is the shortest and the tracking target is speaking, it is also conceivable to determine whether or not the distance to the tracking frame TR is closer than a specified distance and the tracking target is speaking.

In this case, while the lecturer who is the tracking target is speaking, masking processing is omitted only from the voice input from the microphone 101 that is closer than a specified distance to the lecturer, and masking processing is performed on the voice input from other microphones 101.

(Processing for Dynamic Image Recorded in Advance)

In the above, it has been assumed that masking processing is selectively performed in real time on voices input from multiple microphones 101. However, with the above-described processing, it is difficult to perform masking processing on a desired voice in a dynamic image recorded with voices input from multiple microphones 101.

Hence, an example of voice masking processing for a dynamic image containing voices input from multiple microphones 101 will be described with reference to a flowchart of FIG. 22.

Figure 22:
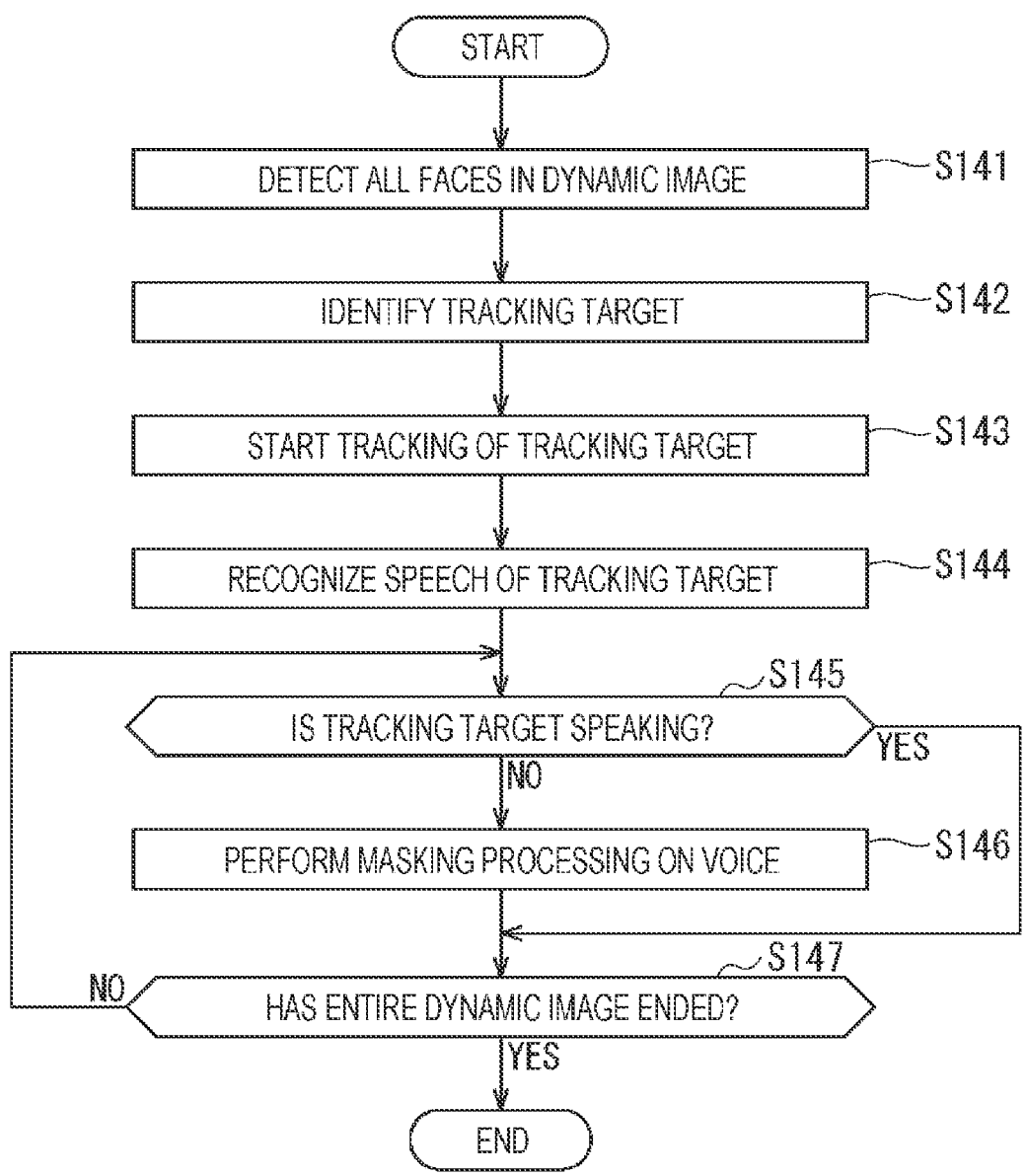
FIG. 22 is a flowchart for describing masking processing of a voice.

Note that the processing in steps S141 to S143 in the flowchart of FIG. 22 is similar to the processing in steps S131 to S133 in the flowchart of FIG. 21, and therefore description is omitted. However, note that, in steps S141 to S143 in the flowchart of FIG. 22, the detection of the face and the tracking of the tracking target are performed on a dynamic image recorded in advance.

That is, when tracking of a tracking target is started in a dynamic image recorded in advance, the speech recognition unit 131 recognizes, in step S144, speech of the tracking target.

In step S145, the non-processing target identifying unit 14c determines whether or not the tracking target is speaking.

If it is not determined, in step S145, that the tracking target is speaking, the processing proceeds to step S146.

In step S146, the voice processor 111 is controlled by the controller 14 to perform masking processing on a voice included in the dynamic image recorded in advance.

On the other hand, if it is determined, in step S145, that the tracking target is speaking, step S146 is skipped. Specifically, during a period in which the tracking target is recognized to be speaking, the voice processor 111 does not perform masking processing on the voice included in the dynamic image recorded in advance.

Thereafter, in step S147, it is determined whether or not the entire dynamic image has ended. If the entire dynamic image has not ended, the processing returns to step S145, and the processing of steps S145 and S146 are repeated.

According to the above processing, voice masking processing is omitted only while the lecturer who is the tracking target is speaking, and voice masking processing is performed during other periods. As a result, even in a dynamic image recorded in advance, the speech sound of the lecturer who is the main subject can be made clear while protecting the privacy of the auditor who is a subject other than the main subject.

<3-3. Modifications>

Figure 23:
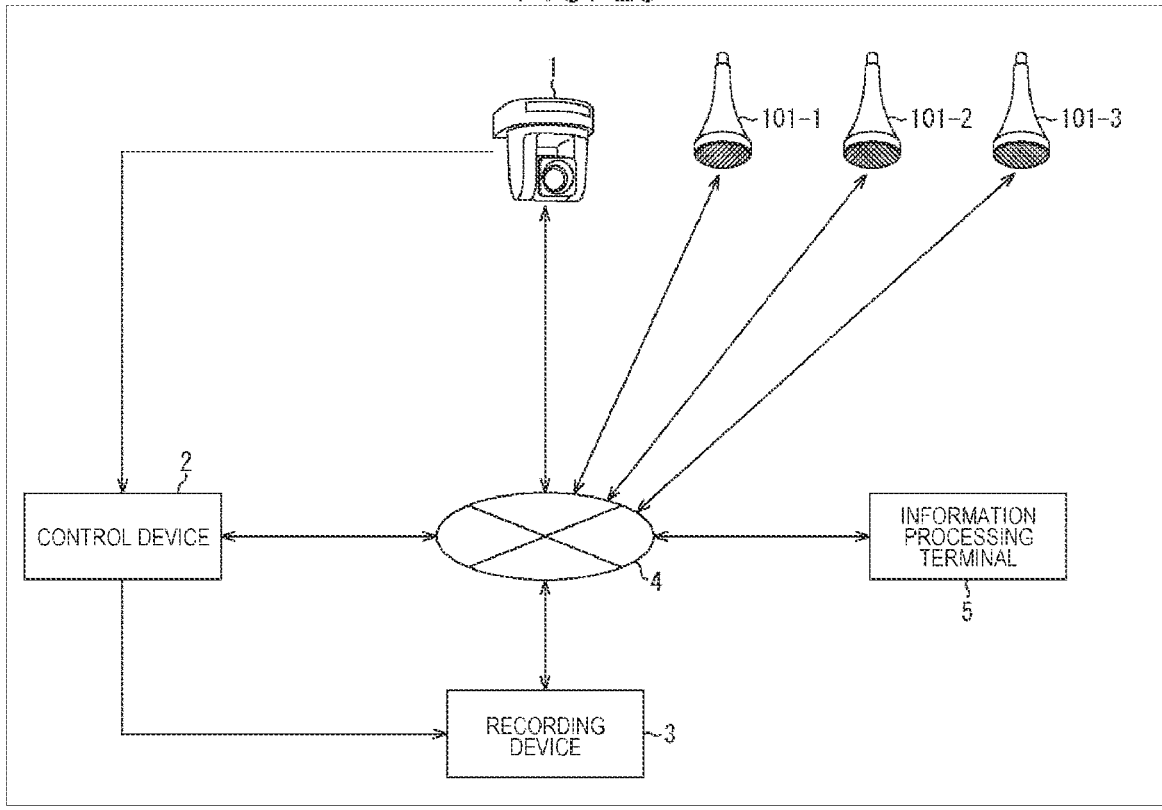
FIG. 23 is a block diagram showing still another configuration example of the image capturing system.

The image capturing system according to the second embodiment of the present disclosure can also have a configuration as shown in FIG. 23.

In an image capturing system of FIG. 23, a microphone 101 (101-1, 101-2, 101-3) is directly connected to a network 4.

A control device 2 of FIG. 23 performs predetermined voice processing on a voice output from the microphone 101 through the network 4.

Figure 24:
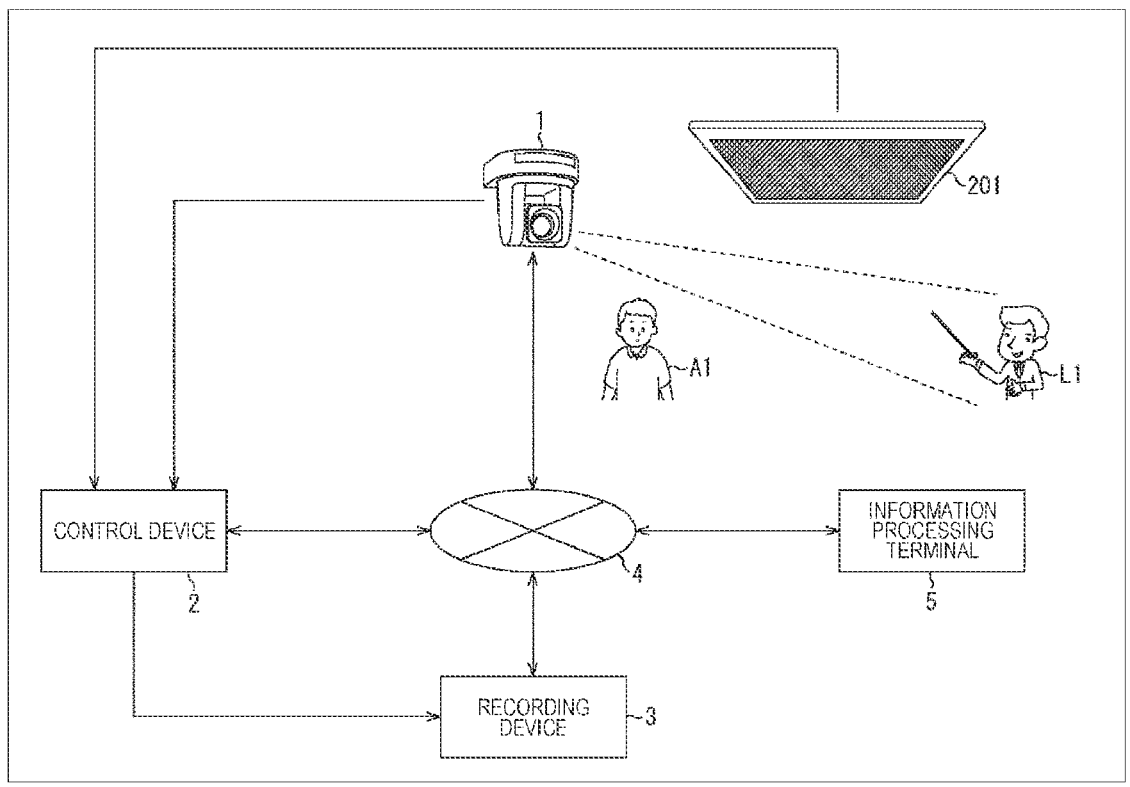
FIG. 24 is a block diagram showing yet another configuration example of the image capturing system.

Alternatively, as in an image capturing system shown in FIG. 24, a directional microphone 201 may be provided instead of the multiple microphones 101.

The directional microphone 201 has a function of collecting a voice from a specific direction.

A control device 2 of FIG. 24 controls the directional microphone 201 so as to collect a voice from the direction in which a subject to be tracked is present. As a result, the speech sound of the lecturer who is the main subject can be made clearer.

In addition, in the above-described image capturing system, in a case where multiple cameras 1 are provided, one camera 1 may capture an image of a lecturer L1 who is the main subject, and another camera 1 may capture an image of an auditor A1 who is a subject other than the main subject.

In this case, in each of the dynamic images from the multiple cameras 1, it is possible to identify the subject that is a non-processing target by assigning the same ID to the same subject by face recognition, for example.

4. Configuration Example of Computer

The series of processing described above can be performed by hardware or software. In a case where the series of processing is executed by software, a program forming the software is installed from a program recording medium to a computer incorporated in dedicated hardware, a general-purpose personal computer, or the like.

Figure 25:
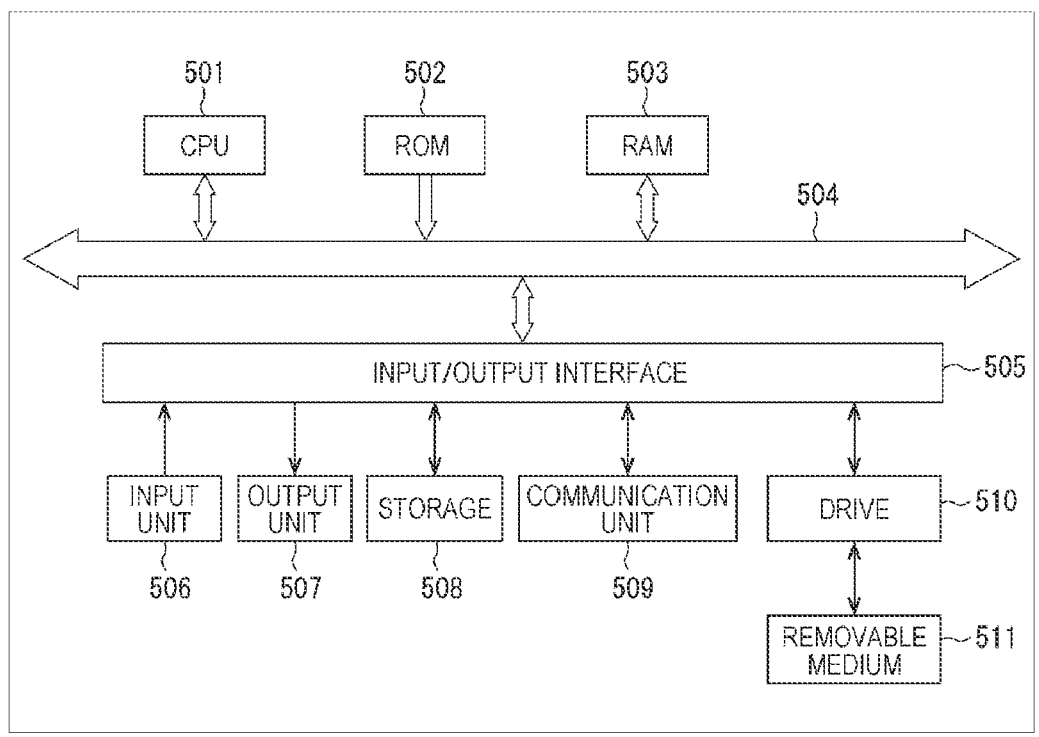
FIG. 25 is a block diagram showing a configuration example of hardware of a computer.

FIG. 25 is a block diagram showing a hardware configuration example of a computer that executes the series of processing described above according to a program.

The control device 2 described above is implemented by a computer having the configuration shown in FIG. 25.

A central processing unit (CPU) 501, a read only memory (ROM) 502, and a random access memory (RAM) 503 are mutually connected through a bus 504.

An input/output interface 505 is also connected to the bus 504. An input unit 506 including a keyboard, a mouse, and the like, and an output unit 507 including a display, a speaker, and the like are connected to the input/output interface 505. Additionally, a storage 508 such as a hard disk and a non-volatile memory, a communication unit 509 such as a network interface, and a drive 510 for driving the removable medium 511 are connected to the input/output interface 505.

In the computer configured as described above, the CPU 501 loads a program stored in the storage 508 onto the RAM 503 through the input/output interface 505 and the bus 504, and executes the program to perform the above-described series of processing, for example.

The program executed by the CPU 501 is provided by being recorded in the removable medium 511 or through a wired or wireless transmission medium such as a local area network, the Internet, or digital broadcasting, and is installed in the storage 508, for example.

Note that the program executed by the computer may be a program that performs processing in chronological order according to the order described in the present specification, or a program that performs processing in parallel, or at necessary timing such as when a call is made.

Embodiments of the present disclosure are not limited to the above-described embodiments, and various modifications can be made without departing from the scope of the present disclosure.

Additionally, the effect described in the present specification is merely an illustration and is not restrictive. Hence, other effects can be obtained.

Moreover, the present disclosure can have the following configurations.

(1)

An information processing apparatus including:
a controller that identifies a non-processing target subject, among multiple subjects in a frame included in a dynamic image, as a non-processing target that is not subjected to predetermined image processing, on the basis of positional relationships between multiple subject areas corresponding to the respective multiple subjects and a specific area in the frame; and
an image processor that performs the predetermined image processing on a processing target area corresponding to a processing target subject other than the non-processing target subject, among the multiple subjects.

(2)

The information processing apparatus according to (1), further including
a tracking unit that controls tracking in which a predetermined subject is regarded as a tracking target subject, among the multiple subjects, in which
the controller identifies the non-processing target subject as the tracking target subject.

(3)

The information processing apparatus according to (2), in which the controller sets a tracking area corresponding to the tracking target subject in the frame, and identifies the processing target subject on the basis of a relationship between the tracking area and the multiple subject areas.

(4)

The information processing apparatus according to (3), in which the multiple subject areas are face areas corresponding to the respective multiple subjects.

(5)

The information processing apparatus according to any one of (1) to (4), in which
the positional relationship indicates whether or not the subject area is located in the specific area, and
the controller identifies, as the non-processing target subject, the subject corresponding to the subject area located in the specific area on the basis of the positional relationship.

(6)

The information processing apparatus according to (5), in which the controller identifies, as the non-processing target subject, the subject corresponding to the subject area located in the specific area for a predetermined time or more.

(7)

The information processing apparatus according to any one of (1) to (6), in which
the controller identifies the non-processing target subject on the basis of a history of posture information of the subject.

(8)

The information processing apparatus according to (7), in which the controller identifies the non-processing target subject on the basis of the posture information in units of frames included in the dynamic image.

(9)

The information processing apparatus according to (8), in which the controller identifies the non-processing target subject on the basis of the posture information in units of a predetermined number of frames.

(10)

The information processing apparatus according to any one of (7) to (9), in which
the posture information includes at least standing information indicating that the subject is standing and sitting information indicating that the subject is seated.

(11)

The information processing apparatus according to any one of (1) to (10), in which
the image processor performs the predetermined image processing on a face area of the processing target subject.

(12)

The information processing apparatus according to (11), in which the image processor performs masking processing as the predetermined image processing.

(13)

The information processing apparatus according to any one of (1) to (12), in which
the controller controls identification of the non-processing target subject at predetermined timing.

(14)

The information processing apparatus according to (13), in which the predetermined timing is timing corresponding to lecture start information indicating a start of a lecture.

(15)

The information processing apparatus according to (14), in which the lecture start information is specified on the basis of the dynamic image or voice information corresponding to the dynamic image.

(16)

The information processing apparatus according to any one of (1) to (15), further including
a voice processor that performs predetermined voice processing on a voice corresponding to a speech sound of the processing target subject.

(17)

The information processing apparatus according to (16), in which among multiple voice input units, the controller identifies, as a non-processing target voice input unit, the voice input unit that is in a predetermined positional relationship with the non-processing target subject, the non-processing target voice input unit being not subjected to the predetermined voice processing, and
the voice processor suppresses output of a voice input from the voice input unit other than the non-processing target voice input unit, as the predetermined voice processing.

(18)

An information processing method by an information processing apparatus, including:
identifying a non-processing target subject, among multiple subjects in a frame included in a dynamic image, as a non-processing target that is not subjected to predetermined image processing, on the basis of positional relationships between multiple subject areas corresponding to the respective multiple subjects and a specific area in the frame; and
performing the predetermined image processing on a processing target area corresponding to a processing target subject other than the non-processing target subject, among the multiple subjects.

(19)

A program for causing a computer to execute processing including:
identifying a non-processing target subject, among multiple subjects in a frame included in a dynamic image, as a non-processing target that is not subjected to predetermined image processing, on the basis of positional relationships between multiple subject areas corresponding to the respective multiple subjects and a specific area in the frame; and performing the predetermined image processing on a processing target area corresponding to a processing target subject other than the non-processing target subject, among the multiple subjects.

(20)

An information processing apparatus including:

a controller that identifies a non-processing target subject, among multiple subjects in a frame included in a dynamic image, as a non-processing target that is not subjected to predetermined image processing, on the basis of a history of posture information corresponding to each of the multiple subjects; and an image processor that performs the predetermined image processing on a processing target area corresponding to a processing target subject other than the non-processing target subject, among the multiple subjects.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Camera
2 Control device
3 Recording device
4 Network
5 Information processing terminal
11 Face detector
12 Tracking unit
13 Image processor
14 Controller
21 Posture estimation unit
22 Tracking unit
23 Image processor
24 Controller
31 Posture estimation unit
12 Tracking unit
13 Image processor
14 Controller
111 Voice processor
131 Speech recognition unit

The invention claimed is:

1. An information processing apparatus, comprising:
a controller configured to identify, a non-processing target subject among a plurality of subjects in a frame, as a non-processing target, wherein
the identification of the non-processing target subject is based on a positional relationship between a plurality of subject areas in the frame and a specific area in the frame,
each subject area of the plurality of subject areas corresponds to a respective subject of the plurality of subjects, and
the frame is in a dynamic image; and
an image processor configured to perform a specific image processing on a processing target area plurality of subject areas, wherein
the processing target area corresponds to a processing target subject among the plurality of subjects,
the processing target subject is other than the non-processing target subject, and
the non-processing target subject is not subjected to the specific image processing.

2. The information processing apparatus according to claim 1, wherein the controller is further configured to:
control tracking of at least one subject of the plurality of subjects, wherein the at least one subject corresponds to a tracking target subject; and
identify the tracking target subject as the non-processing target subject.

3. The information processing apparatus according to claim 2, wherein the controller is further configured to:
set a tracking area corresponding to the tracking target subject in the frame; and
identify the processing target subject based on a relationship between the set tracking area and the plurality of subject areas.

4. The information processing apparatus according to claim 3, wherein
the plurality of subject areas corresponds to a plurality of face areas, and
each face area of the plurality of face areas is associated with the respective subject among the plurality of subjects.

5. The information processing apparatus according to claim 1, wherein
the positional relationship indicates that at least one subject of the plurality of subjects is in the specific area, and
the controller is further configured to identify, based on the positional relationship, the at least one subject as the non-processing target subject.

6. The information processing apparatus according to claim 5, wherein
the controller is further configured to identify the at least one subject as the non-processing target subject in a case where the positional relationship indicates that the at least one subject is in the specific area for at least a specific time.

7. The information processing apparatus according to claim 1, wherein
the controller is further configured to identify the non-processing target subject based on a history of posture information, and
the posture information is associated with at least one subject of the plurality of subjects.

8. The information processing apparatus according to claim 7, wherein
the posture information of the at least one subject is in units of frames in the dynamic image, and
the frames include the frame.

9. The information processing apparatus according to claim 8, wherein
the posture information of the at least one subject is in units of a specific number of frames among the frames in the dynamic image.

10. The information processing apparatus according to claim 7, wherein
the posture information includes at least one of standing information or sitting information,
the standing information indicates a standing posture of the at least one subject, and
the sitting information indicates a sitting posture of the at least one subject.

11. The information processing apparatus according to claim 1, wherein the image processor is further configured to perform the specific image processing on a face area of the processing target subject.

12. The information processing apparatus according to claim 11, wherein
the image processor is further configured to perform a masking processing as the specific image processing.

13. The information processing apparatus according to claim 1, wherein
the controller is further configured to control the identification of the non-processing target subject at a specific timing.

14. The information processing apparatus according to claim 13, wherein
the specific timing is timing corresponding to lecture start information, and
the lecture start information indicates a start of a lecture.

15. The information processing apparatus according to claim 14, wherein
the lecture start information is specified based on at least one of the dynamic image or voice information corresponding to the dynamic image.

16. The information processing apparatus according to claim 1, further comprising
a voice processor configured to perform a specific voice processing on a voice,
wherein the voice corresponds to a speech sound of the processing target subject.

17. The information processing apparatus according to claim 16, wherein
the controller is further configured to identify, a first voice input device among a plurality of voice input devices, as a non-processing target voice input device, wherein
the first voice input device is in a specific positional relationship with the non-processing target subject, and
the voice processor is further configured to suppress an output of a second voice input device of the plurality of voice input devices, wherein
the output of the second voice input device is associated with a voice input of the processing target subject,
the suppression of the output of the second voice input device corresponds to the specific voice processing,
the second voice input device is other than the non-processing target voice input device, and
the non-processing target voice input device is not subjected to the specific voice processing.

18. An information processing method by an information processing apparatus, the information processing method comprising:
identifying, a non-processing target subject among a plurality of subjects in a frame, as a non-processing target, wherein
the identification of the non-processing target subject is based on a positional relationship between a plurality of subject areas in the frame and a specific area in the frame,
each subject area of the plurality of subject areas corresponds to a respective subject of the plurality of subjects, and
the frame is in a dynamic image; and
performing a specific image processing on a processing target area among the plurality of subject areas, wherein
the processing target area corresponds to a processing target subject among the plurality of subjects,
the processing target subject is other than the non-processing target subject, and
the non-processing target subject is not subjected to the specific image processing.

19. A non-transitory computer-readable medium having stored thereon, computer executable instructions, which when executed by a computer, cause the computer to execute operations, the operations comprising:
identifying, a non-processing target subject among a plurality of subjects in a frame, as a non-processing target, wherein
the identification of the non-processing target subject is based on a positional relationship between a plurality of subject areas in the frame and a specific area in the frame,
each subject area of the plurality of subject areas corresponds to a respective subject of the plurality of subjects, and
the frame is in a dynamic image; and
performing a specific image processing on a processing target area among the plurality of subject areas, wherein
the processing target area corresponds to a processing target subject among the plurality of subjects,
the processing target subject is other than the non-processing target subject, and
the non-processing target subject is not subjected to the specific image processing.

* * * * *